(12) United States Patent
Jethmalani et al.

(10) Patent No.: US 11,446,887 B2
(45) Date of Patent: Sep. 20, 2022

(54) METHOD AND SYSTEM FOR MOLDING OF THERMOPLASTIC OPTICAL POLYMERS

(71) Applicant: Novol, Inc., San Leandro, CA (US)

(72) Inventors: Jagdish Jethmalani, San Leandro, CA (US); Sanjiban Chakraborty, San Leandro, CA (US); Monica Bhatia, San Leandro, CA (US)

(73) Assignee: NOVOL, INC., San Leandro, CA (US)

( * ) Notice: Subject to any disclaimer, the term of this patent is extended or adjusted under 35 U.S.C. 154(b) by 0 days.

(21) Appl. No.: 17/080,380

(22) Filed: Oct. 26, 2020

(65) Prior Publication Data

US 2021/0046717 A1 Feb. 18, 2021

Related U.S. Application Data

(63) Continuation-in-part of application No. PCT/US2019/028495, filed on Apr. 22, 2019.

(Continued)

(51) Int. Cl.
| | |
|---|---|
| *B29D 11/00* | (2006.01) |
| *B29C 51/30* | (2006.01) |
| *G02B 1/04* | (2006.01) |
| *G02C 7/02* | (2006.01) |
| *B29K 33/00* | (2006.01) |
| *B29K 67/00* | (2006.01) |
| *B29K 69/00* | (2006.01) |

(Continued)

(52) U.S. Cl.
CPC .......... *B29D 11/0049* (2013.01); *B29C 51/30* (2013.01); *B29D 11/00413* (2013.01); *G02B 1/041* (2013.01); *G02C 7/02* (2013.01); *B29K 2033/12* (2013.01); *B29K 2067/00* (2013.01); *B29K 2069/00* (2013.01); *B29K 2075/00* (2013.01); *B29K 2077/00* (2013.01); *B29K 2909/08* (2013.01)

(58) Field of Classification Search
CPC .......... B29D 11/0049; B29D 11/00413; B29C 51/30; G02B 1/041; G02C 7/02
See application file for complete search history.

(56) References Cited

U.S. PATENT DOCUMENTS

| | | |
|---|---|---|
| 2,332,461 A | 10/1943 | Muskat |
| 2,379,218 A | 6/1945 | Dial |

(Continued)

FOREIGN PATENT DOCUMENTS

WO 2019147848 A1 8/2019

OTHER PUBLICATIONS

International Search Report in International Patent Application No. PCT/US19/28495, dated Aug. 16, 2019, in 13 pages.

*Primary Examiner* — Mathieu D Vargot
(74) *Attorney, Agent, or Firm* — Duane Morris LLP

(57) ABSTRACT

Provided herein are methods of molding thermoplastic polymers into optical elements. The optical elements in the form of cylindrical discs, semi-finished lens blanks or finished lenses are compression molded at high temperature typically above thermoplastic polymers softening temperature and under high pressure. The semi-finished lens blanks and finished lenses are molded using front and back glass molds inside a mold assembly which reshapes the cylindrical discs that are either previously molded or cut out from thick slab. Also provided are methods for producing single vision and progressive addition lens prescriptions.

23 Claims, 31 Drawing Sheets

Related U.S. Application Data

(60) Provisional application No. 62/663,504, filed on Apr. 27, 2018.

(51) Int. Cl.
  *B29K 75/00* (2006.01)
  *B29K 77/00* (2006.01)

(56) References Cited

U.S. PATENT DOCUMENTS

| | | | |
|---|---|---|---|
| 2,384,116 A | 9/1945 | Muskat | |
| 3,028,365 A | 4/1962 | Hermann | |
| 3,136,741 A | 6/1964 | Hermann | |
| 3,153,008 A | 10/1964 | Fox | |
| 4,689,397 A | 8/1987 | Shinnick | |
| 4,775,733 A | 10/1988 | Kanemura | |
| 4,780,522 A | 10/1988 | Kajimoto | |
| 4,836,960 A * | 6/1989 | Spector | B29C 43/021 264/2.2 |
| 5,059,673 A | 10/1991 | Kanemura | |
| 5,087,758 A | 2/1992 | Kanemura | |
| 5,234,473 A | 8/1993 | Piper | |
| 5,608,115 A | 3/1997 | Okazaki | |
| 5,662,951 A * | 9/1997 | Greshes | B29D 11/00211 425/384 |
| 5,689,324 A | 11/1997 | Lossman | |
| 5,908,876 A | 6/1999 | Fujii | |
| 5,989,462 A | 11/1999 | Buazza | |
| 6,015,512 A | 1/2000 | Yang | |
| 6,042,754 A * | 3/2000 | Yang | B29C 33/36 264/1.1 |
| 6,162,376 A | 12/2000 | Mead | |
| 6,201,037 B1 | 3/2001 | Lipscomb | |
| 6,284,159 B1 | 9/2001 | Lossman | |
| 6,416,307 B1 | 7/2002 | Buazza | |
| 6,419,873 B1 | 7/2002 | Buazza | |
| 6,451,226 B1 | 9/2002 | Buazza | |
| 6,632,535 B1 | 10/2003 | Buazza | |
| 6,673,278 B1 | 1/2004 | Buazza | |
| 6,698,708 B1 | 3/2004 | Powers | |
| 6,723,260 B1 | 4/2004 | Powers | |
| 6,939,899 B2 | 9/2005 | Buazza | |
| 6,964,479 B2 | 11/2005 | Buazza | |
| 7,025,458 B2 | 4/2006 | Vu | |
| 7,114,696 B1 | 10/2006 | Su | |
| 9,042,019 B2 | 5/2015 | Su | |
| 9,156,209 B2 * | 10/2015 | Riebel | B01D 53/885 |
| 9,335,443 B2 | 5/2016 | Su | |
| 2003/0111747 A1 * | 6/2003 | Chiu | B29C 43/361 264/1.32 |
| 2020/0354507 A1 | 11/2020 | Bhatia | |

* cited by examiner

| | Front Side Mold | Back Side Mold | Total Molds |
|---|---|---|---|
| Single Vision: (SV)<br>Sphere Rx (-10 to +8D) (@ 0.25D interval) | 9 | 73 | 82 |
| Single Vision: (SV)<br>Sphero-Cylinder (-10 to +8D, -0.25 to -6D) (Rotate 1 to 180°) (@ 0.25D interval) | 9 (same as above) | 1,752 | 1,761 |
| Progressive Addition: (PAL)<br>Sphero-Cylinder (-10 to +8D, -0.25 to -6D) (Rotate 1 to 180°) (@ 0.25D interval); and +0.75 to +4.00D Add Power (14 Left +14 Right) | 252 | 1,752 (same as above) | 2,004 |
| | 261 | 1,825 | 2,086 |

FIG. 17

| | Front Side Mold | Back Side Mold (Cylinder Rotated 1° from 0-180°) | Back Side Mold (Cylinder Rotated 0-90° and 91-180°/each degree) | Back Side Mold (Cylinder for each degree from 0-180°) |
|---|---|---|---|---|
| Single Vision: (SV) Sphere Rx (-10 to +8D) (@ 0.25D interval) | 6 | 73 | 73 | 73 |
| Single Vison: (SV) Sphero-Cylinder (-10 to +8D, -0.25 to -6D) (Rotate 1 to 180°) (@ 0.25D interval) | 6 (same as above) | 1,752 | 157,680 | 315,360 |
| Progressive Addition: (PAL) Sphero-Cylinder (-10 to +8D, -0.25 to -6D) (Rotate 1 to 180°) (@ 0.25D interval); and + 0.75 to +4.00D Add Power (14 Left and +14 Right) | 168 | 1,752 (same as above) | 157,680 (same as above) | 315,360 (same as above) |
| TOTAL MOLDS | 174 | 1,825 | 157,753 | 315,433 |

FIG. 18

| # | Sieved with Mesh (#) | Front mold back curve (D) | Back mold front curve (D) | Molded Lens front curve (D) | Molded Lens back curve (D) | Center thickness (mm) | Edge thickness (mm) | Molded Rx (D) | ANSI Tolerance (±0.13D) | Pass/Fail |
|---|---|---|---|---|---|---|---|---|---|---|
| 1 | 100 | -3.25 | 6.5 | 3.375 | -6.625 | 1.4 | 3.0 | -3.25 | 0 | Pass |
| 2 | 60 | -3.25 | 6.5 | 3.25 | -6.5 | 1.5 | 3.2 | -3.25 | 0 | Pass |
| 3 | 100 | -3.5 | 6.5 | 3.5 | -6.5 | 1.7 | 3.2 | -3.0 | 0 | Pass |
| 4 | 100 | -3.5 | 6.5 | 3.5 | -6.375 | 1.8 | 3.2 | -3.0 | -0.125 | Pass |
| 5 | 100 | -3.5 | 6.5 | 3.5 | -6.375 | 1.8 | 3.1 | -3.0 | -0.125 | Pass |
| 6 | 100 | -3.5 | 6.5 | 3.5 | -6.5 | 1.8 | 3.1 | -3.0 | 0 | Pass |
| 7 | 100 | -3.5 | 6.5 | 3.5 | -6.375 | 1.8 | 3.1 | -3.0 | -0.125 | Pass |
| 8 | 100 | -3.5 | 6.5 | 3.5 | -6.375 | 1.8 | 3.2 | -3.0 | -0.125 | Pass |
| 9 | 100 | -3.5 | 6.5 | 3.5 | -6.375 | 1.8 | 3.2 | -3.0 | -0.125 | Pass |
| 10 | 100 | -3.5 | 6.0 | 3.5 | -6.125 | 2.0 | 3.3 | -3.0 | +0.125 | Pass |

FIG. 30

| Lens | Power (D) | Center thickness (mm) | Edge thickness (mm) | FDA approved drop ball test (Pass/Fail) | European drop ball test (Pass/Fail) | Static load test (Pass/Fail) |
|---|---|---|---|---|---|---|
| Prescription lens | -3.0 | 1.7 | 3.2 | Pass | Pass | Pass |

FIG. 31

METHOD AND SYSTEM FOR MOLDING OF THERMOPLASTIC OPTICAL POLYMERS

CROSS-REFERENCE TO RELATED APPLICATIONS

This application claims the benefit of priority to U.S. Provisional Application No. 62/663,504 entitled "Molding of Thermoplastic Optical Polymers", filed on Apr. 27, 2018, and PCT/US2019/028495 entitled "Method and System for Molding of Thermoplastic Polymers", filed on Apr. 22, 2019, the entireties of which are each incorporated by reference herein.

STATEMENT AS TO RIGHTS TO INVENTIONS MADE UNDER FEDERALLY SPONSORED RESEARCH AND DEVELOPMENT

This invention was made with government support under Small Business Innovation Research Program Phase I grant SBIR 1648374 and Phase II grant SBIR 1831288 awarded by the National Science Foundation and United States Department of Agriculture NIFA Phase I grant SBIR 12497233 and Phase II grant SBIR 12815496. The government has certain rights in the invention.

FIELD

This disclosure relates to thermoplastic semi-finished lens blanks or finished prescription eyeglass lenses, and to methods of making such semi-finished lens blanks or finished prescription eyeglass lenses. This disclosure also relates to compression molding of cylindrical discs or pulverized polymer powder into semi-finished lens blanks and finished prescription eyeglass lenses.

BACKGROUND

Since shards of aircraft plastic canopy were first identified as having biocompatibility with aircraft pilots' eyes during World War II, plastics have been studied as a source for making ophthalmic lenses such as spectacle, contact, and intraocular lenses. PPG Industries developed a carbonate-based resin (Columbia Resin, CR-39) described in U.S. Pat. Nos. 2,332,461, 2,379,218, and 2,384,116. This resin material, originally developed to make reinforced plastic to form a molded fuel tank for the B-17 bomber during World War II, was thermally cured and molded as plastic sheets to be used as artificial glass.

In 1955, thermoplastic polycarbonate material was developed. These thermoplastics can be remolded by applying heat, and exhibit high impact resistance and toughness. Examples of these materials can be found in U.S. Pat. Nos. 3,028,365 and 3,136,741, describing high molecular weight linear polycarbonate, and U.S. Pat. No. 3,153,008. In the 1970s, polycarbonates were developed primarily for aerospace applications. By the 1980s, a demand had developed for lightweight and impact-resistant eyeglass lenses. It was found that polycarbonate could be injection molded either into plano (no power) lenses or thick semi-finished lens blanks which can be further processed to make prescription (Rx) eyeglass lenses.

In 1990s, high refractive index (1.6 and higher) resins were developed which may be cast molded to form thermoset semi-finished lens blanks. High index monomers and polymers exhibiting high refractive indexes and densities are described in U.S. Pat. Nos. 4,689,397, 4,775,733, 4,780,522, 5,059,673, 5,087,758, 5,608,115, and 5,908,876. These resins were poured as liquid between glass molds held apart by gasket or tape and thermally cured to form the semi-finished lens blanks. These lens blanks are typically 75 mm in diameter and 10-15 mm in center thickness depending on the prescription that will be cut on the back surface of the lens blank. Processing of high index thermoset according to a prescription is performed similarly to the processing of CR-39 or polycarbonate lens blanks. This processing involves cutting on the back surface of the lens blanks, thereby causing 80-90% of the lens blank material to be discarded as landfill waste which is a huge amount of wasted material that will require a very long time to degrade and is a big disadvantage of the current process. Additional problems with the current process of lathe cutting is the maintenance of the production equipment and the cost and down time for repairs which adds to the processing or turn-around time for delivering the completed eyeglasses to the end user.

Alternative methods involve the molding of semi-finished lens blanks from thermoplastic polycarbonate CR-39 and high index resins using techniques such as cast-molding, injection molding, and compression molding. U.S. Pat. Nos. 5,234,473, 6,015,512, and 6,042,754 describe compression molding methods for thermoplastic polycarbonate to reduce birefringence observed in the injection molding of the polycarbonate lenses. The polycarbonate is heated past its melting temperature of 155° C. and poured between front and back glass molds which are slowly compressed and cooled down to eliminate stress-induced birefringence in the lens matrix. U.S. Pat. No. 6,162,376 describes the compression of glass molds with optical alignment and a floating canister to protect the glass molds from shattering under high pressure during the compression molding of polycarbonate lens blanks.

Systems and methods of cast molding finished prescription lenses between glass molds of known front and back radii held apart by a gasket to make predetermined prescription and ultraviolet (UV)-curing liquid monomers are described in U.S. Pat. Nos. 5,989,462, 6,201,037, 6,416,307, 6,419,873, 6,451,226, 6,673,278, 6,698,708, 6,939,899, and 6,964,479. Progressive glass lens molds that can be used in the liquid monomer curing systems to produce progressive lens blanks are described in U.S. Pat. Nos. 5,689,324 and 6,284,159. Similar cast molding processes are described in U.S. Pat. Nos. 6,201,037 and 7,114,696. These methods require a large number of front and back molds to make sphere and sphero-cylindrical corrections to cover −6 to +4 D sphere range and −0.25 to −4 D cylinder range along a 1-180° meridian axis, where the molds with cylindrical corrections along certain meridians are rotated from 1° to 180° to provide the desired correction along that axis. Pouring of liquid monomer in between the glass molds and keeping them bubble free during and after UV-curing has been accomplished in the process of making finished prescription lenses. Additionally, incorporation of hard coat and antireflective (AR) coating in the UV-curing cast molding process is described in U.S. Pat. Nos. 6,632,535, 9,042,019 and 9,335,443. Furthermore, U.S. Pat. No. 7,025,458 describes a thermoforming process to apply an in-mold hard coat to the ophthalmic lens blank that is poured into the mold cavity.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary methods and systems are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In accordance with various exemplary embodiments, exemplary methods and systems for making an optical element are disclosed herein. In some embodiments, the method includes providing a thermoplastic material. The thermoplastic material can be in the form of a slab or a disc having a substantially cylindrical shape with predetermined dimensions or in the form of a polymer powder. In further embodiments, the method further comprises providing an assembly comprising one or more annular rings made of stainless steel or any other material that can withstand the high temperatures and pressures of the processes disclosed herein. In some embodiments, the rings are configured to hold one or more sandwiched glass molds to aid in the mold center optical alignment and to provide a control on the edge thickness of the molded lens, wherein each sandwiched glass mold comprises a front glass mold and a back glass mold. A front glass back surface of the front glass mold has a front mold radius, and a back glass front surface of the back glass mold has a back mold radius. The method further comprises inserting at least a portion of the thermoplastic material between the front glass mold and the back glass mold of the assembly. The method further comprises positioning the assembly between two platens of a hydraulic press. The method further comprises heating the assembly to a predetermined heating temperature for a predetermined heating time in between the heated platens. The method further comprises compressing the assembly at a predetermined compression pressure for a predetermined compression time. The method further comprises cooling the assembly to room temperature, thereby forming one or more thermoplastic optical elements, wherein each thermoplastic optical element comprises an optical element front surface and an opposite optical element back surface, wherein the optical element front surface has a front surface radius substantially equal to the front mold radius, and wherein the optical element back surface has a back surface radius substantially equal to the back mold radius. The method further comprises removing the one or more thermoplastic optical elements from the assembly. In some embodiments, the method can result in only 10-20% waste in creating the prescription lens.

In some embodiments, the thermoplastic material comprises one or more polymers formed from petroleum or biobased monomers. In some embodiments, the one or more polymers comprise one or more crosslinked polymers. In some embodiments, the biobased monomers comprise sugar moieties derived from corn. The biobased monomers can comprise sorbitol, isosorbide, isomannide, isoidide, and derivatives and combinations thereof. In some embodiments, the one or more polymers comprise polyurethane, polycarbonate, polyester, polyamide, poly(meth)acrylate, or combinations thereof.

In some embodiments, the thermoplastic material has the shape of disc having a diameter from 25 mm to 95 mm. In some embodiments, the thermoplastic material has the shape of a disc having a center thickness from 1 mm to 25 mm. In some embodiments, the thermoplastic material is cut from a molded slab having predetermined dimensions.

In some embodiments, the front glass mold and the back glass mold are each lined with a silicone pad or aluminum pad filled with glass wool or aluminum blocks with their radius matching the outer surface of glass molds positioned adjacent to the thermoplastic material upon insertion of at least a portion of the thermoplastic material into the assembly. In some embodiments, the one or more stainless steel annular rings are interconnected and configured to hold nine sandwiched glass molds, wherein the cooling forms nine thermoplastic optical elements.

In some embodiments, the predetermined heating temperature is between 100° C. and 210° C. depending on the glass transition (Tg) temperature of the thermoplastic material. The glass transition temperature for a crosslinked polymer is between 130° C. and 145° C., which is also known as softening temperature, at which the material is easily moldable into any shape, and for commercial polycarbonate is between 147° C. and 155° C. In some embodiments, the predetermined heating time is between 15 minutes and 30 minutes depending on the nature of the thermoplastic material. The heating time can be sufficient to bring the temperature of the thermoplastic material to come to the heating temperature. If the thermoplastic material is thin then the heating time can be short (e.g., 3 minutes to 5 minutes), and if the thermoplastic material is thick then the heating time can be longer (e.g., 5 minutes to 7 minutes). In some embodiments, the predetermined compression pressure is between 100 pounds and 20,000 pounds depending on a desired center thickness of the one or more thermoplastic optical elements. In some embodiments, the predetermined compression time is between 30 seconds and 15 minutes depending on both the nature of the thermoplastic cylindrical discs and the desired center thickness of the semi-finished lens blanks.

In some embodiments, the one or more thermoplastic optical elements are a semi-finished lens blank or a finished prescription lens. In some embodiments, the one or more thermoplastic optical elements are semi-finished lens blanks, finished single vision lenses, or finished progressive addition lenses. The finished prescription lens can be selected from either a single vision lens or progressive addition lens.

In another aspect, the disclosure is to a thermoplastic optical element that is molded according to any of the provided methods as described above.

In one embodiment, for crosslinked polyurethanes or thermoplastic polymers that do not exhibit any flow properties or very limited flow properties, direct compression molding can be performed to mold it into the desired shape and form. In this embodiment, a stainless-steel mold comprising a bottom plate cut to a predetermined diameter of curvature of 0, 1, 2, . . . 10 D of power and polished to a #8 mirror finish; a hollow cylinder of predetermined diameter and height and equipped with a nozzle for attaching a vacuum line; and a top plate with a cylindrical piston whose head has a predetermined diameter of curvature of 4 or 6 D of power and polished to a #8 mirror finish; when assembled together creates a hollow cavity. The polymer powder may be transferred into the hollow cavity and heated between two platens of a hot press to yield a semi-finished lens blank whose front and back surfaces are replicas of the back and front steel plates, respectively. Glass molds of predetermined radii can be used along with the bottom and top stainless steel molds to match with the molds predetermined radii and used as the molding surface of the final optical element.

In one embodiment, cross-linked polyurethanes or thermoplastic polymers that do not exhibit any flow properties or very limited flow properties, can be molded by transferring the pulverized polymer between two flat stainless-steel plates (#8 mirror polished or use of mold release agent or Kapton® sheet) and heated between two platens of a compression system to yield a molded thick or thin slab. The slab can be cut into cylindrical discs of predetermined dimensions (diameter and thickness) by using a stainless-steel punch or by any other cutting processes.

In another embodiment, a stainless-steel mold with a certain number of cavities of predetermined dimensions can be used for molding cylindrical discs directly. The pulverized polymer can be transferred into the cavity of the mold and then using matching pistons that fit inside the mold cavity the pulverized polymer can be compressed at a predetermined temperature, pressure, vacuum and time, to yield individual molded cylindrical discs which can be removed from the mold directly. Based on the spacing between the piston and the back plate of the mold, thick or thin cylindrical discs can be molded.

In one embodiment, the molded thermoplastic thin cylindrical disc can be reshaped between front and back glass molds of predetermined curvatures and compressed at a predetermined temperature (beyond softening point or glass transition temperature), pressure and time into the desired prescription Rx lenses that correct for sphere or spherocylindrical errors; or front-side progressive addition power and back side sphere or sphero-cylindrical corrections.

In one embodiment, the molded thermoplastic thick cylindrical disc can be reshaped between front and back molds of predetermined curvatures and compressed at a predetermined temperature, pressure and time into desired semi-finished lens blanks that can then be lathe, diamond or freeform cut into prescription lenses.

In one embodiment, a stainless-steel mold with a certain number of cavities and glass molds of predetermined radii and dimensions can be used for molding finished Rx lenses directly. The pulverized polymer can be transferred into the cavity of the glass molds and, using matching pistons that fit inside the mold cavity and glass mold that match the respective radii of curvatures, the pulverized polymer can be compressed at a predetermined temperature, pressure, vacuum and time, to yield individual molded Rx lenses which can be removed from the mold directly. Based on the spacing between the piston and the back plate of the mold, thick semi-finished lens blanks that can be lathe cut to thick Rx lenses or thin Rx lenses that correct for sphere or sphero-cylindrical errors, or front-side progressive addition power and back side sphere or sphero-cylindrical errors, can be directly molded.

BRIEF DESCRIPTION OF DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

FIG. 17 is a table showing the number of glass molds needed to make finished lenses with single vision spherical correction, single vision sphero-cylindrical correction, and progressive addition lenses with sphero-cylindrical correction where the sphero-cylindrical correction along each meridian in the back glass mold is rotated from 0 to 180° axis, in accordance with some embodiments.

FIG. 18 is a table showing the number of glass molds needed to make finished lenses with single vision spherical correction, single vision sphero-cylindrical correction, and progressive addition lenses with sphero-cylindrical correction where the sphero-cylindrical correction along each meridian in the back glass mold is rotated from 0 to 180° axis; sphero-cylindrical correction along each meridian in the back glass molds for 0 to 90° axis are rotated from 91 to 180° axis, and sphero-cylindrical correction along each meridian in the back glass mold is for 0 to 180° axis, in accordance with some embodiments.

FIG. 30 is a table showing the Rx lenses molded using the direct molding process using front and back glass molds of predetermined radii of curvatures and the Rx measured by manual lensometer and the ANSI tolerance of Rx power, in accordance with some embodiments.

FIG. 31 is a table showing a −3 D prescription lens subjected to FDA, European Drop Ball tests, and the Static Load test and the lens passed all these tests, in accordance with some embodiments.

DETAILED DESCRIPTION OF EXEMPLARY EMBODIMENTS

I. Introduction

Figure 1:
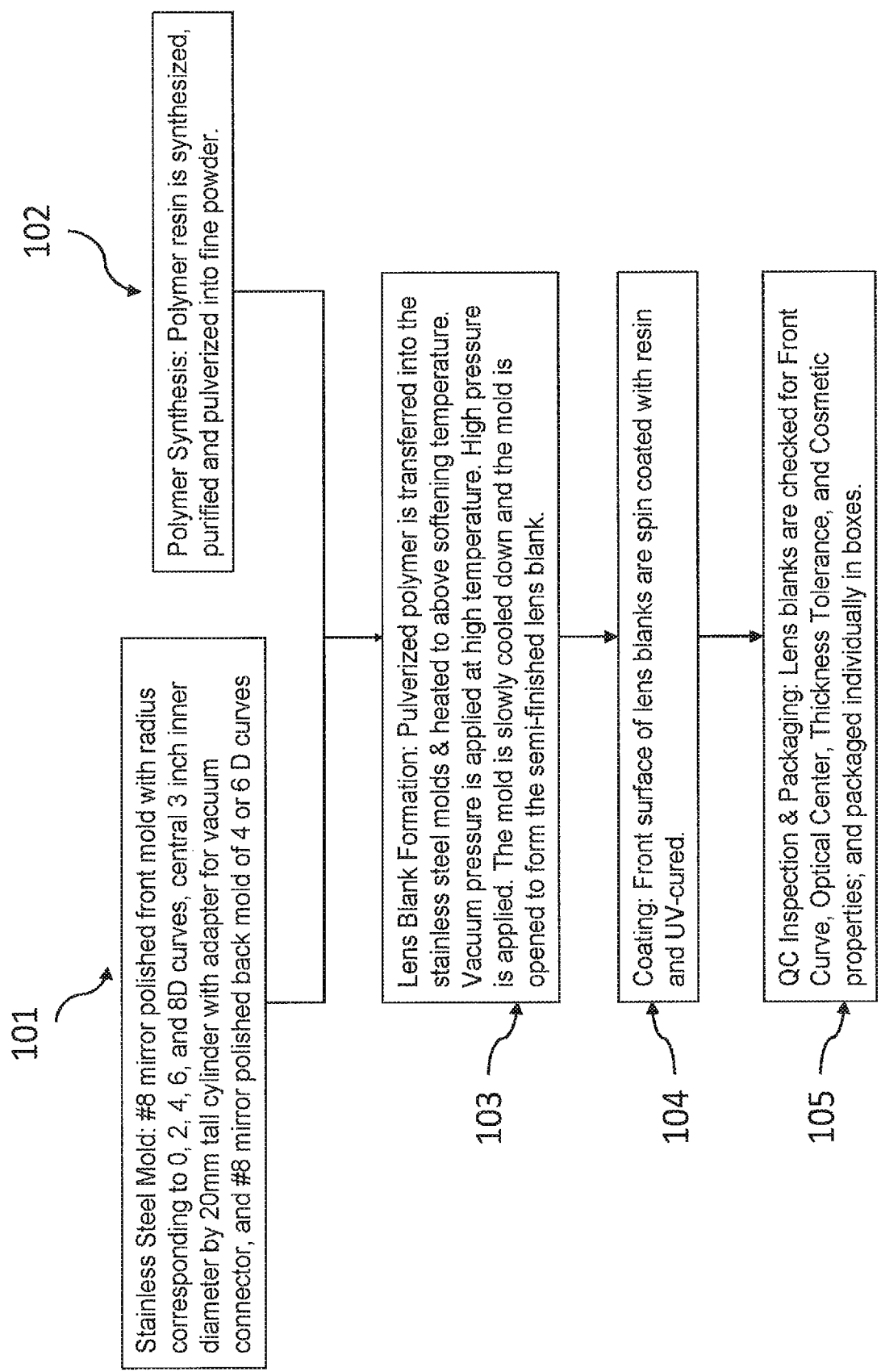
FIG. 1 is a flow chart of a process for direct molding of a thermoplastic material into individual semi-finished lens blanks, in accordance with some embodiments.

The following disclosure describes various exemplary embodiments for illustrating different features and aspects of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Existing lens molding processes, such as injection molding, requires material to be flowable in nature. For example, cast molding requires liquid monomers to be filled into the mold and thermally cured into a thermoset. On the other hand, crosslinked bioplastic polymers do not exhibit any flowable properties once heated beyond their glass transition temperature or softening temperature, as there is no melting phase behavior observed in differential scanning calorimetric (DSC) analysis. Instead, a glass transition temperature (Tg) above 135° C. is observed. Thus, many conventional molding processes cannot be used to form optical elements from cross-linked bioplastic polymers. Examples of cross-linked bioplastic polymers and their compositions are described in co-pending PCT application no. PCDUS19/15002, entitled "Sorbitol Based Crosslinked Optical Polymers" filed on Jan. 24, 2019 and the US pending utility patent application Ser. No. 16/936,854 entitled "Sorbitol Based Crosslinked Optical Polymers" filed on Jul. 23, 2020, the entirety of which is incorporated by reference herein.

Conventional processes for molding ophthalmic lenses typically involve either injection molding or compression molding. An injection molding process is generally used with linear polymeric thermoplastics (i.e., polymers without any crosslinking), that upon heating exhibit a $T_g$ followed by melting temperature much higher than $T_g$. The molten polymer is squeezed through a small orifice of an extruder that is held at an elevated temperature in a stainless-steel mold, and is quickly cooled to form molded semi-finished lens blanks or plano finished lenses that are then removed from the mold. Compression molding processes are generally also used with linear thermoplastics. In compression molding, the thermoplastic is heated to above its melting temperature and the molten polymer is poured into a bottom glass mold and sandwiched between the bottom glass mold and a top glass mold. The thermoplastic is further subjected to a heat cycle followed by slow cooling to create semi-finished lens blanks or finished plano lenses.

In both of these conventional processes, the thermoplastic is a linear polymer without any crosslinking between different polymer chains, allowing for melting of the polymer to render it flowable at elevated temperature. In contrast, crosslinked thermoplastic polymers exhibit no melting temperature and no, or limited, flow behavior. With these materials, additional processing of the polymer is required, such as pulverizing the polymer into fine powder followed by molding a bubble free slab or sheet or sieving the polymer powder and using fine powder with particles <150 µm. This molded slab or sheet can then be reshaped between glass molds into optical quality semi-finished lens blank or finished prescription lens by compression molding the thermoplastic in two steps. The reshaping of the thermoplastic polymer slab or sheet can be done with linear chain polymers. Alternately, the pulverized thermoplastic can be transferred into a stainless steel mold with predetermined radius of curvature already formed in the mold cavity to shape the polymer powder into semi-finished lens blanks or finished prescription lenses. This process requires mirror polished stainless-steel molds, making it very expensive for the production of finished prescription lenses, which require a large number of molds. The inventors have discovered that glass molds, which are advantageously significantly cheaper than mirror polished stainless-steel molds, can be used to produce optical elements from thermoplastic materials including crosslinked thermoplastic polymers.

In addition, processing of semi-finished lens blanks of all types of lens materials (CR-39, thermoplastic polycarbonate, and high index thermoset) into prescription lenses requires lathe or diamond cutting of the back surface of the lens blanks using commercial machinery or a freeform multi-axis diamond cutter and polisher. Such processing generates lens material waste (or lens swarf) and requirements for coolant recycling, cleaning of lens swarf, machine calibration, and regular equipment maintenance. In addition, the freshly lathe or diamond cut lens requires polishing it to optical quality by multi-axis polishers. The polishing requires consumables such as polishing pads, polishing compound, water to rinse and clean the lens surface, and regular maintenance. Each of these issues adds cost to the lens making process.

Conventional prescription finished lens production processes typically start with a semi-finished lens blank having a diameter of approximately 65 mm to 85 mm and a center thickness of approximately 8 mm to 12 mm. The lens blank is lathe or diamond cut to 1.5-mm center thickness to create the desired prescription on the back surface of the lens blank in steps that typically generate up to an 80% loss of material. This lost material from the cutting and shaving or lens swarf is generally washed with water, packed as briquettes using an ultracentrifuge, and discarded as waste in a landfill.

In contrast, the inventors have discovered that a slab of approximately 2 mm to 6 mm in center thickness can be compression molded to 1.5 mm, thus generating prescription optical elements while producing much less waste. Moreover, conventional lens generation processes require machines such as generators and polishers, polishing solution, coolant water mix, cutting tool replacement, maintenance, calibration, daily cleaning, etc. to make optical quality lenses. Such expensive equipment and protocols can be advantageously replaced by using the disclosed compression molding unit. The disclosed device, systems, and methods instead use heated platens and molds with glass lens blanks, which are significantly less expensive and easier to replace.

II. Definitions

As used herein, the term "polymer" refers to an organic substance composed of a plurality of repeating structural units (monomeric units) covalently linked to one another.

As used herein, the term "optical element" refers to any transparent object that transmits light. An optical element can have the shape of, for example, a flat transparent disc, a cylindrical disc, a coating, a prism, or a lens. Examples of optical elements include, but are not limited to, ophthalmic lens blanks, prescription eyeglass lenses, concave-convex lenses, biconvex lenses, biconcave lenses, and combinations thereof.

As used herein, the term "thermoplastic" refers to a polymer that can be molded when heated above its softening or glass transition temperature. Examples of thermoplastic polymers include, but are not limited to, polyurethane, polycarbonate, polyester, polyamide, poly(meth)acrylate, and combinations thereof. This molding process can be repeatable by reheating the thermoplastic material and subsequently altering its shape while heated.

As used herein, the term "glass mold" refers to a concave and/or convex lens blank made of glass. A glass mold can have a predetermined front radius and back radius, and center and edge thickness. In some embodiments, a glass mold is chemically treated to enhance its chemical and thermal resistance and/or strengthen its ability to withstand high pressure, e.g., greater than 1000 pounds of pressure.

As used herein, the term "petroleum-based monomers" refers to monomers derived from coal, oil, or tar extracted from earth or obtained from other non-renewable sources.

As used herein, the term "biobased monomers" refers to monomers derived from renewable biological sources, such as plants. Biobased monomers can be derived from corn, rice, soybean, grasses, or other wild plant or agricultural crop. Biobased monomers can be derived from plant seed hulls or from the plant biomass itself. Examples of biobased monomers include, but are not limited to, sorbitol, isosorbide, isomannide, isoidide, furan, furfuraldehyde, glucose, fructose, cellulose, and derivatives and combinations thereof.

As used herein, the term "predetermined" refers to certain targeted or desired values, as well as values within acceptable, e.g., plus or minus 10%, tolerances below and above the targeted or desired values.

As used herein, the term "base curve" refers to the front curvature of a lens blank or glass mold.

As used herein, the term "semi-finished" refers to a lens blank that is not used as a spectacle lens until a prescription is generated within it. Semi-finished lens blanks can have dimensions, for example, of 65-85 mm diameter and 8-15 mm in thickness.

As used herein, the term "finished" refers to lenses that having configured according to an optical prescription such as those of single vision or progressive addition lenses. Finished lenses can also be plano lenses which do not have any prescription.

As used herein, the term "prescription" refers to characteristics of corrective optical lenses suitable for use by an individual in need of vision correction. A prescription can refer to the refractive power of the lens.

As used herein, the term "curvature" refers to the radius of the curvature of a lens which can be flat, convex, or concave in shape. The radius (R) of curvature is measured in millimeters and converted to Diopters (D) with the equation $[(n-1)\times 1000]/R$, where n is the refractive index of the lens material.

As used herein, the term "single vision" refers to a finished lens that has only one power throughout the entire lens.

As used herein, the terms "spherical prescription" or "sphere correction" refer to a lens having spherical power correction such as −10 or −6 or +2 D of power.

As used herein, the term "sphero-cylindrical prescription" refers to a lens having both sphere and cylindrical correction (astigmatism at certain meridian axis) such as −6 D of sphere and −0.5 D of cylinder along 123° meridian axis.

As used herein, the term "progressive addition prescription" refers to a lens having both a single vision (distance region of the lens) and add power (in the bottom portion) for reading purpose without any sharp transition or ledge as seen in bifocal lenses.

III. Description of Exemplary Embodiments

The present disclosure provides many molding processes for making optical elements from thermoplastic polymers.

FIG. 1 is a flow chart of one direct molding process, in accordance with some embodiments of the invention. In step 101, a stainless-steel mold is provided, wherein the mold has a bottom plate having specific radii that corresponds to the front curvature of the semi-finished lens blanks that will be molded from the surface. In step 102, which can be performed concurrently or sequentially with step 101, a thermoplastic polymer is synthesized, purified, and pulverized into fine powder. In step 103, the pulverized thermoplastic polymer is transferred into the cavity of the stainless-steel mold, sandwiched with the top mold where heat, vacuum and pressure are applied to mold the polymer into semi-finished lens blanks. In some embodiments, the sandwiched mold is placed between heated platens of a compression press and heated to temperature ranging from 150-160° C. for 15 minutes, followed by applying vacuum with a 1 horse power vacuum pump (such as Welch 1376 vacuum pump) attached via a hose to the nozzle adapter on the mold and further heated for 15 minutes under vacuum, followed by applying pressure of 400-500 pounds exerted on the two platens for predetermined compression time of 30 seconds to 15 minutes. In step 104, the molded lens blank front surface is coated with a hard coat resin and UV-cured. Commercial resins that are UV-curable or thermally curable are most suitable for use in the provided methods include those, for example, from Ultra Optics (Minneapolis, Minn.), or from SDC Technologies (Irvine, Calif.). In step 105, the molded lens blank is quality checked for front curvature, center and edge thickness tolerances, and cosmetic specifications, and packaged in boxes for shipping.

Figure 2:
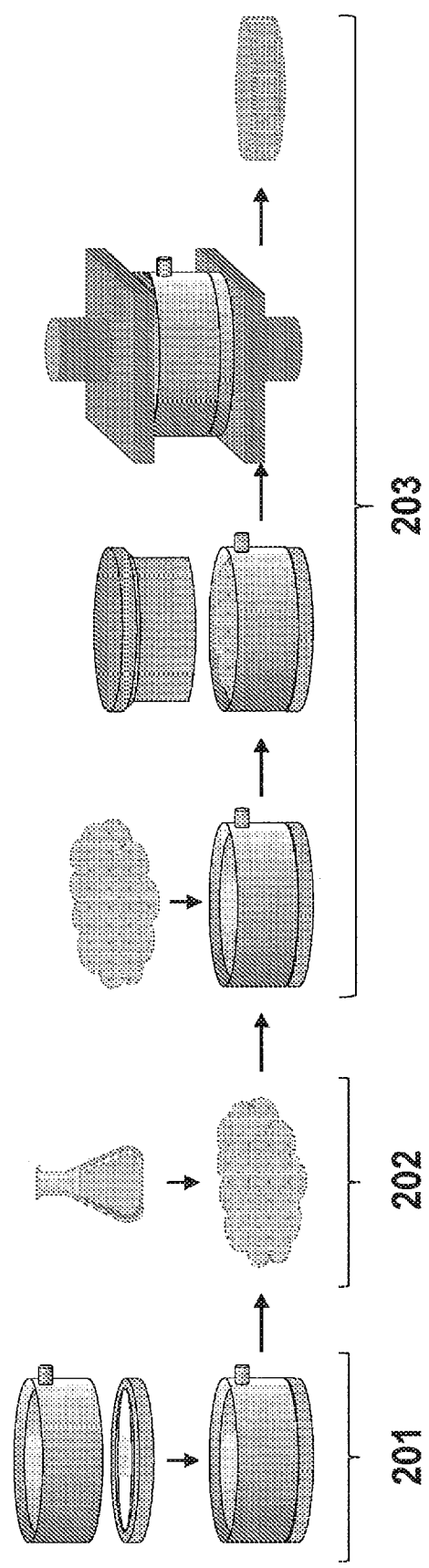
FIG. 2 is a schematic illustration of direct molding of thermoplastic material into individual semi-finished lens blanks, in accordance with some embodiments.

FIG. 2 is a schematic illustration of a direct molding process, in accordance with some embodiments. A stainless-steel mold 201 is made of a hollow cylinder that is, for example, 20 mm tall with an adapter for a vacuum connector, and a bottom plate that serves as a front mold having a radius corresponding to 0, 2, 4, 6, and 8 D in power. The front mold is cut in the central 75-mm inner diameter and polished to a #8 mirror polished surface. Polymer resin 202 is synthesized, purified and pulverized into fine powder. Molding process 203 includes transferring the pulverized polymer to the mold cavity. Process 203 also includes closing the mold using a #8 mirror polished back stainless-steel mold with a cylindrical piston whose head has a curvature of 4 or 6 D in power. Process 203 also includes compressing the entire mold assembly between heated platens (represented by two plates with pistons in the $3^{rd}$ illustration) at a predetermined temperature, pressure and vacuum for a predetermined period of time. In some embodiments, the range for temperature is 150-160° C., vacuum applied from a 1 horse power vacuum pump, pressure exerted on the platens range from 400-500 pounds, and time for molding range from 15-45 minutes. These parameters were determined empirically by observing the molded article in terms of optical clarity and transparency. The mold is then slowly cooled down to room temperature and is opened to remove the semi-finished lens blank. Additional optional steps of the processes such as hard coat and quality inspection and packaging are not shown in FIG. 2.

Figure 3:
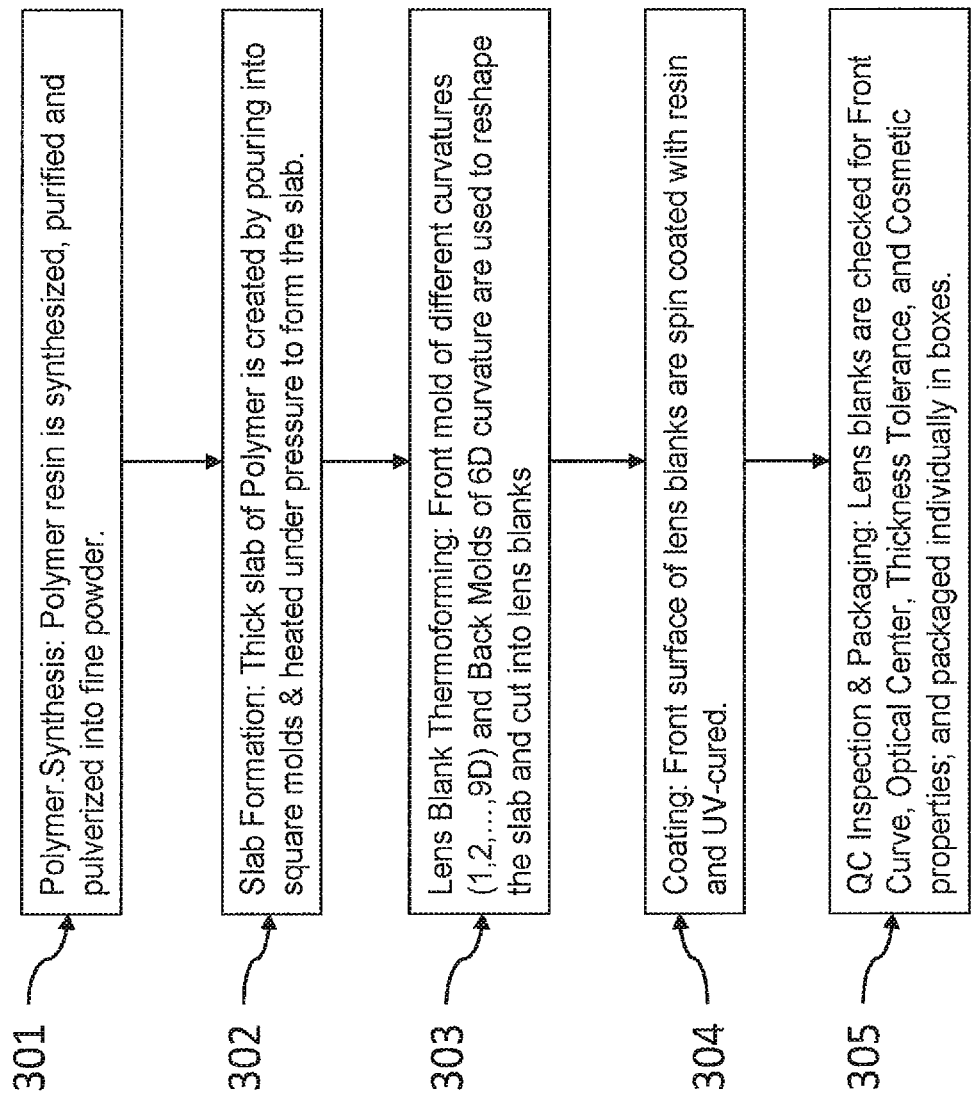
FIG. 3 is a flow chart of a process for direct molding of thermoplastic material into a slab from which several semi-finished lens blanks are molded, in accordance with some embodiments.

FIG. 3 is a flow chart of another direct molding process, in accordance with some embodiments. In step 301, a thermoplastic polymer is synthesized, purified, and pulverized into fine powder. In step 302, a thick slab is formed by transferring the powder into the cavity of a mold. In some embodiments, the mold can be, for example, a square stainless-steel mold with tall walls preferably between 1 to 30 mm, more preferably between 10-15 mm in height. The mold can have a port for a vacuum adapter. In step 303, the thick slab is reshaped by the molding process using glass molds on both sides of the slab to make semi-finished lens blanks, and then the molded blanks are cut out of the slab. In step 304, a hard coat resin application on the front surface is performed, and the lens blanks are UV-cured. In step 305, the lens blanks are quality checked for tolerances and cosmetic properties, and packaged for shipment.

Figure 4:
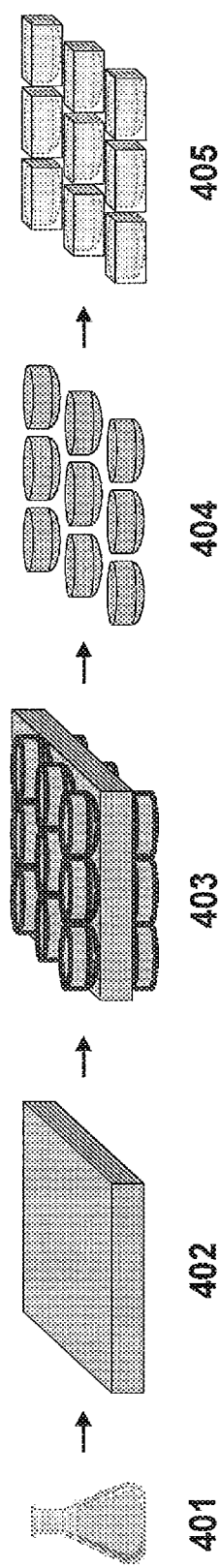
FIG. 4 is a schematic illustration of direct molding of thermoplastic material into a slab from which several semi-finished lens blanks are molded, in accordance with some embodiments.

FIG. 4 is a schematic illustration of a direct molding process, in accordance with some embodiments. First, a polymer resin 401 is synthesized, poured into square molds (not shown), and heated under pressure to form a slab 402. The slab is then subjected to semi-finished lens blank molding 403, wherein front mold of 9 different curvatures (1, 2, . . . , 9 D) and back molds of 4 D and 6 D curvature are used at a predetermined temperature and pressure, for a predetermined period of time to reshape the slab that is then cut into semi-finished lens blanks 404. In some embodiments, the range for temperature is 140-145° C., pressure exerted on the platens range from 400-500 pounds, and predetermined compression time of 5-7 minutes. It is interesting to note that the reshaping process does not require the high temperature and time used for making the slab or disc. The front surface of the semi-finished lens blanks is then spin coated with hard coat resin and UV-cured, and quality inspection and packaging 405 is performed.

Figure 5:
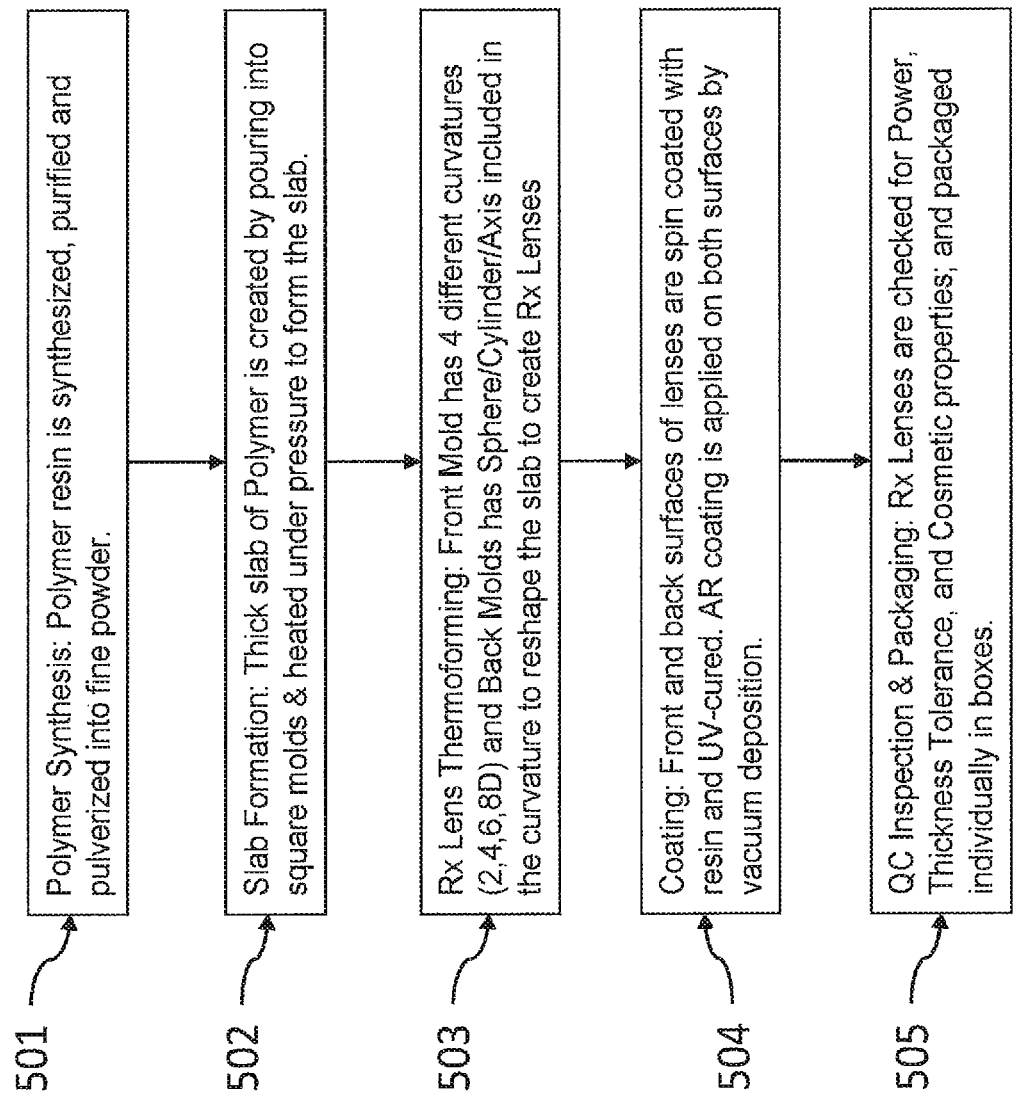
FIG. 5 is a flow chart of a process for direct molding of thermoplastic material into slab from which a pair of finished lenses are molded, in accordance with some embodiments.

FIG. 5 is a flow chart of a direct molding process, in accordance with some embodiments. In step 501 a thermoplastic polymer is synthesized, purified, and pulverized into fine powder. In step 502, a thick slab is formed by transferring the powder into the cavity of a mold. The mold can be, for example, a square stainless-steel mold with tall walls and a port for a vacuum adapter. In step 503, the thick slab is reshaped by the molding process using glass molds on both sides of the slab to make finished lenses and then the molded lenses are cut out of the slab. In step 504, a hard coat resin application on the front and back surface is performed, and the finished lenses are UV-cured and coated with an antireflective (AR) coating. AR coatings suitable for use with the provided methods include those manufactured by SatisLoh (Baar, Switzerland), for example. In step 505, the lenses are quality checked for tolerances and cosmetic properties, and packaged for shipment.

Figure 6:
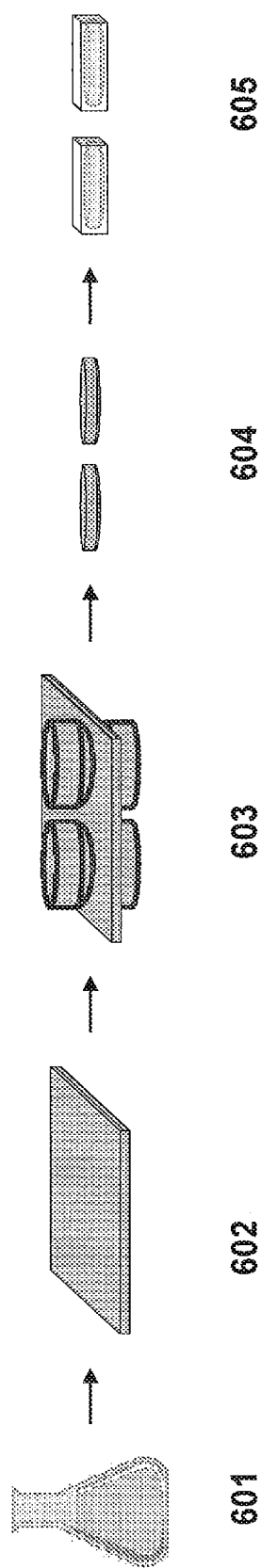
FIG. 6 is a schematic illustration of direct molding of thermoplastic material into a slab from which a pair of finished lenses are molded, in accordance with some embodiments.

FIG. 6 is a schematic illustration of a direct molding process, in accordance with some embodiments. A polymer resin 601 is synthesized, poured into square molds (not shown), and heated under pressure to form a thick slab 602. The slab is then subjected to a finished prescription lens molding 603, wherein front mold of 9 different curvatures (1, 2, . . . , 9 D) and several back molds with Sphere/ Cylinder/Axis included in the curvature are used at a predetermined temperature and pressure for a predetermined duration of time as described above with respect to FIG. 4 to reshape the slab to create prescription lenses 604 that are then cut out. The front and back surfaces of the finished prescription lenses are spin coated with hard coat resin and UV-cured, and quality inspection and packaging 605 is performed.

Figure 7:
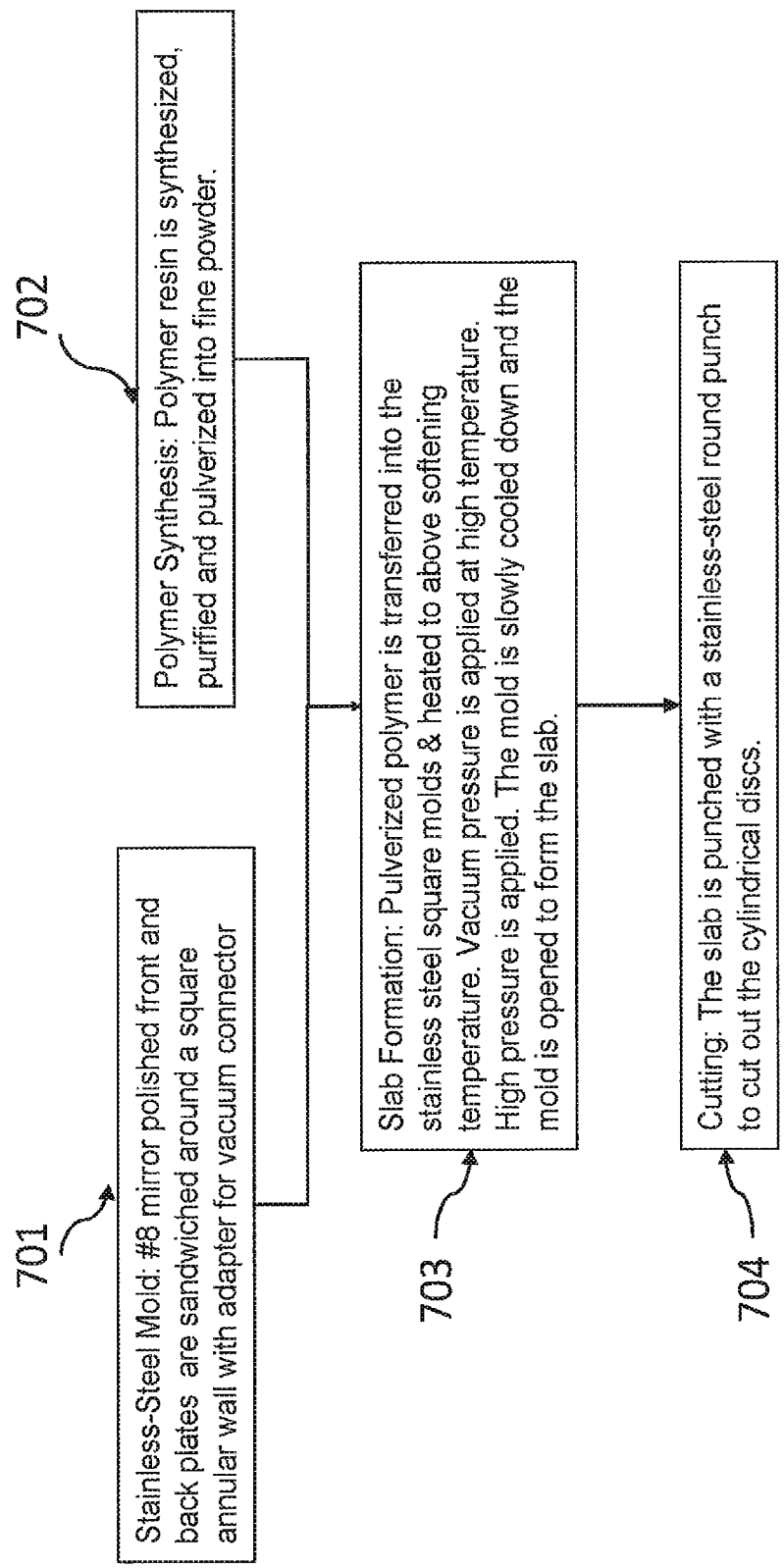
FIG. 7 is a flow chart of a process for direct molding of thermoplastic material into a slab from which several cylindrical discs are molded, in accordance with some embodiments.

FIG. 7 is a flow chart of a direct molding process, in accordance with some embodiments. In step 701, a mold is provided, wherein the mold can be made of #8 mirror polished square stainless-steel front and back plates and an annular square wall with a port for a vacuum adapter. In step 702, which can be performed in parallel or sequentially with step 701, a thermoplastic polymer is synthesized, purified, and pulverized into fine powder. In step 703, the pulverized polymer is transferred into the cavity of the stainless-steel mold and heated under pressure and vacuum for predetermined a period of time as described above in FIG. 2, such that the pulverized polymer becomes soft and pliable and can be shaped into, for example, a thick slab. In step 704, the thick slab is subjected to a stainless-steel round punch to cut out cylindrical discs with flat surfaces. In some embodiments, a mold release agent and/or Kapton® film (high temperature) release film is used in the molding process.

Figure 8:
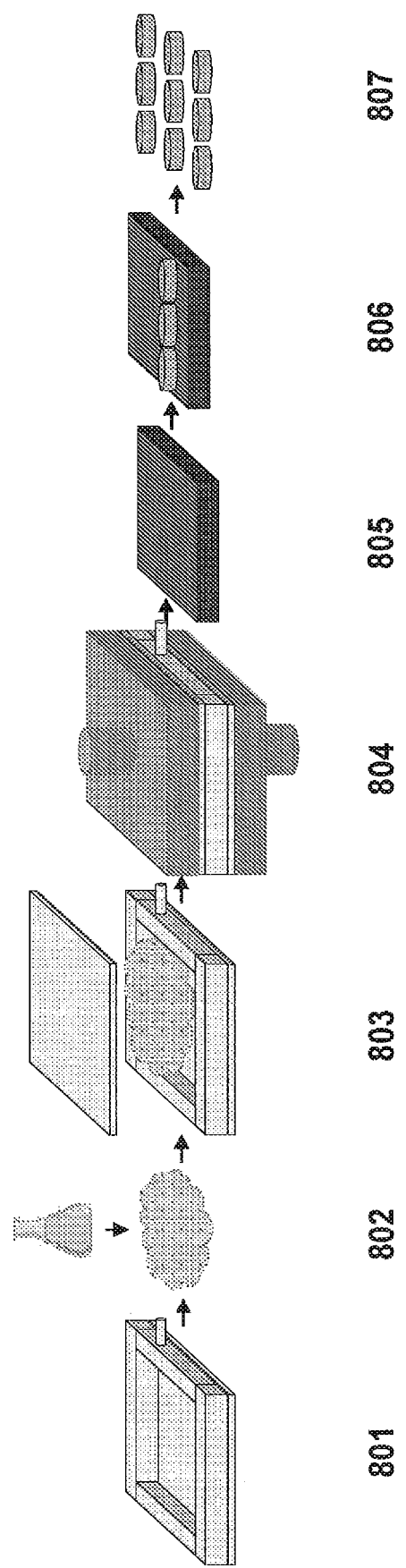
FIG. 8 is a schematic illustration of direct molding of thermoplastic material into a slab from which several cylindrical discs are molded, in accordance with some embodiments.

FIG. 8 is a schematic illustration of a direct molding process, in accordance with some embodiments. An assembly 801 is provided, wherein the assembly includes, for example, a 9.5×9.5 inch square hardened #8 mirror polished stainless-steel bottom plate having a 0.25-inch thick walled square annular wall (15 mm tall) with a vent port for attaching a vacuum line. A thermoplastic polymer 802 is synthesized, purified, and pulverized into fine powder. The stainless-steel mold cavity is filled with pulverized polymer powder and closed with a second 9.5×9.5 inch square hardened #8 mirror polished stainless-steel top plate 803. The assembled mold thus has a cavity that is 9 inch×9 inch square and 15 mm in height. The mold is closed with #8 mirror polished top stainless-steel plate 804, and the sandwiched mold assembly is placed between two parallel heated platens. The polymer inside the molds is subjected to a predetermined temperature, pressure and vacuum for a predetermined period of time as described above with respect to FIG. 2. The mold and the slab inside are cooled to room temperature, the vacuum line is disconnected and the slab 805 is removed from the mold. The slab is then cut out by using a stainless-steel round punch 806 of diameter 75 mm. Cylindrical discs 807 of 75-mm diameter and 15-mm height are thus molded.

Figure 9:
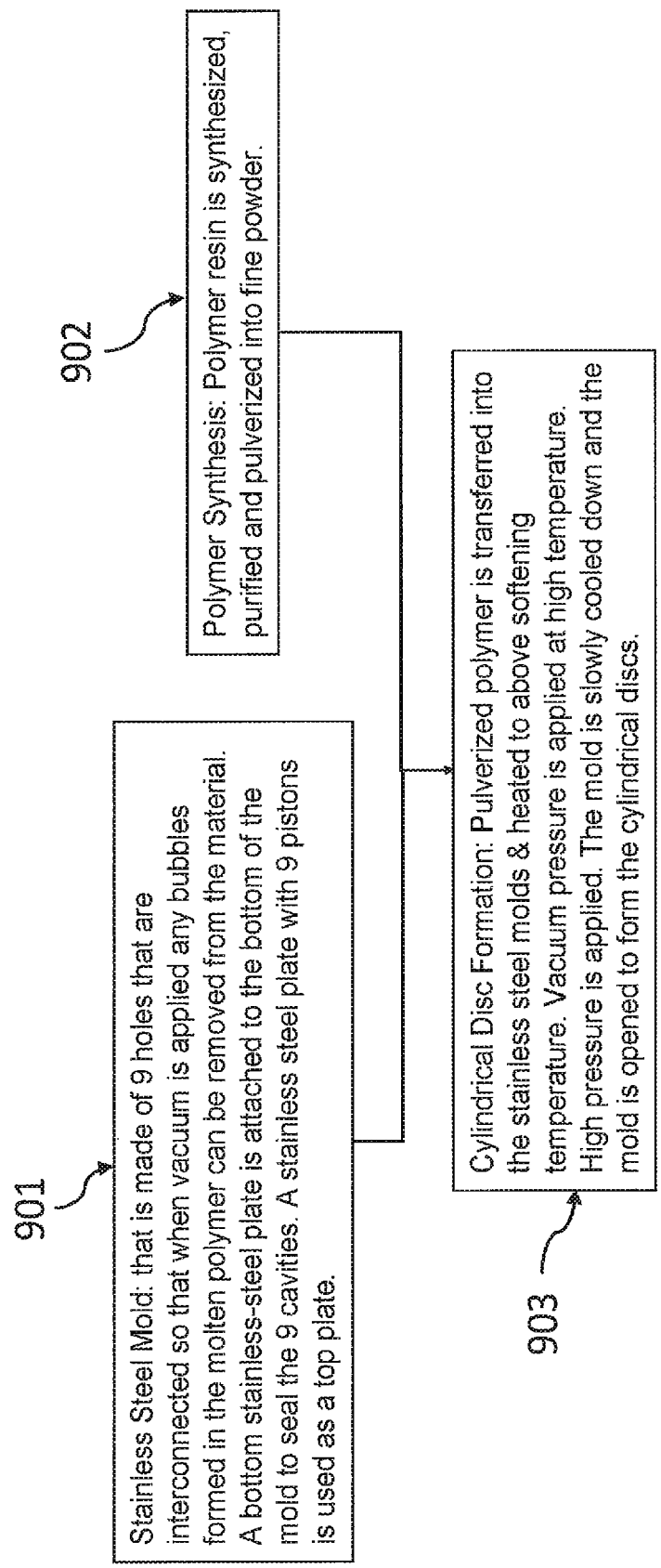
FIG. 9 is a flow chart of a process for direct molding of thermoplastic material into several cylindrical discs, in accordance with some embodiments.

FIG. 9 is a flow chart of a direct molding process, in accordance with some embodiments. In step 901 a mold is provided, wherein the mold can be a stainless-steel mold with a plurality (e.g., 9) of round holes that are interconnected so that when vacuum is applied it is evenly pulling out air from all 9 cavities upon mold assembly. A bottom stainless-steel plate is attached to the bottom side of the mold to create 9 cavities. A top stainless-steel plate with 9 pistons is used as a top plate. In step 902, a thermoplastic polymer is synthesized, purified, and pulverized into powder. In step 903, the pulverized polymer is transferred into the stainless-steel mold and subjected to a predetermined temperature, pressure and vacuum for a predetermined period of time as described above with respect to FIG. 2. The mold is slowly cooled down and opened, and cylindrical discs are removed from the mold.

Figure 10:
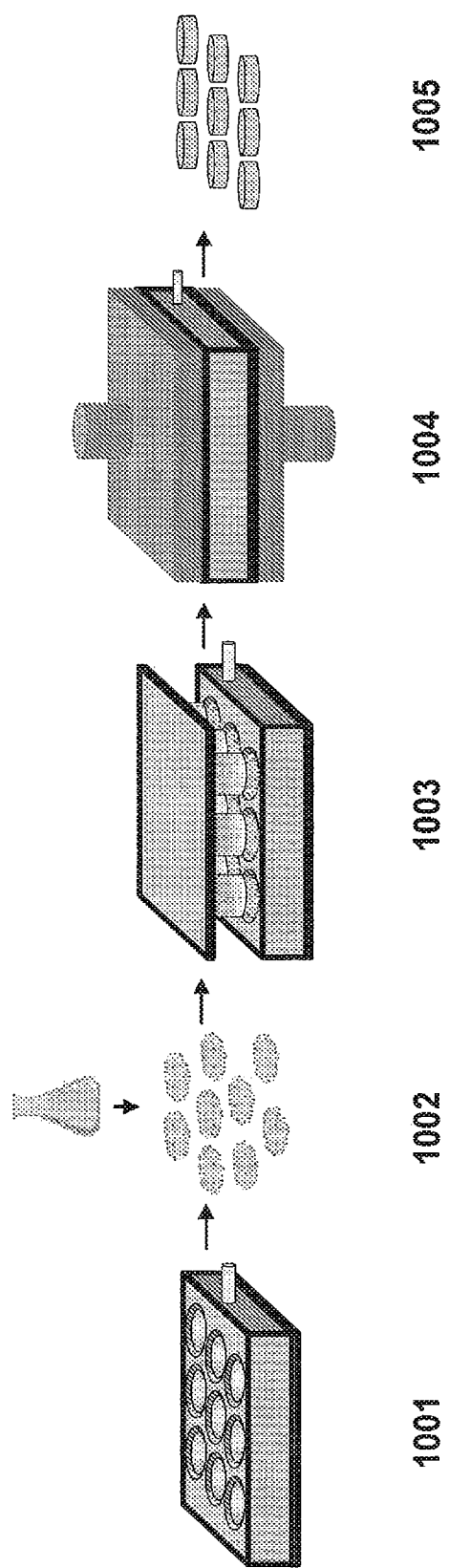
FIG. 10 is a schematic illustration of direct molding of thermoplastic material into several cylindrical discs, in accordance with some embodiments.

FIG. 10 is a schematic illustration of a direct molding process, in accordance with some embodiments. An assembly 1001 is provided, wherein the assembly includes, for example, a stainless-steel mold with 9 round holes of 75-mm diameter and a height of 15 mm. The 9 round holes are interconnected so that when vacuum is applied it is evenly pulling out air from all 9 cavities when the mold is assembled. A bottom stainless-steel plate is attached to the bottom side of the mold to create 9 cavities. A known amount of pulverized polymer 1002 is weighed and added to each of these 9 cavities, and a top stainless-steel plate 1003 with 9 pistons of diameter 74.75 mm and height of 5 mm is inserted on top. The sandwiched mold assembly 1004 is placed between two parallel heated platens, and the polymer inside the molds is subjected to a predetermined temperature, pressure and vacuum for a predetermined period of time as described above with respect to FIG. 2. The mold is cooled to room temperature, the vacuum line is disconnected, and the mold is opened to remove 9 pieces of 75-mm diameter and 10-mm thickness in height, cylindrical discs 1005.

Figure 11:
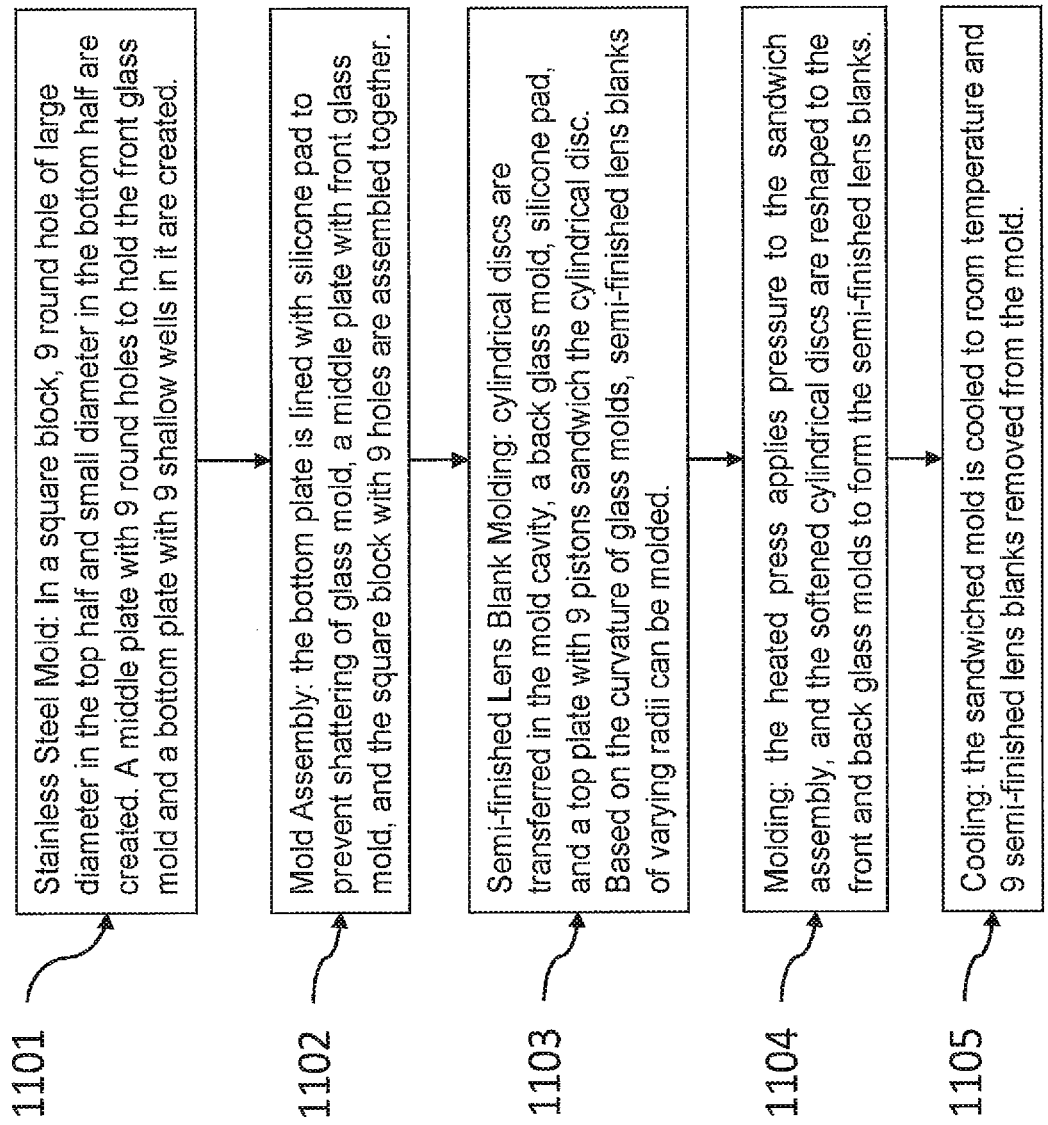
FIG. 11 is a flow chart of direct molding of thermoplastic material into cylindrical discs from which semi-finished lens blanks are molded, in accordance with some embodiments.

FIG. 11 is a flow chart of a direct molding process, in accordance with some embodiments. In step 1101 a mold is provided, wherein the mold can be a stainless-steel mold that comprises (i) a square block with 9 round holes of different diameter in the top half vs. the bottom-half, (ii) a middle plate with 9 round holes, and (iii) a bottom plate with 9 shallow wells. In step 1102, the bottom plate is lined with silicone pad to prevent shattering of the glass mold, a middle plate holds front glass mold, and the square block with 9 hollow cavities is assembled together with the other mold elements. In step 1103, cylindrical discs are transferred into the hollow cavities, back glass molds, silicone pads, and top plate with 9 pistons, sandwiching the cylindrical discs for semi-finished lens blank molding. Based on the curvature of glass molds, semi-finished lens blanks of varying radii can be molded in this way. In step 1104, the mold assembly is placed between two platens of a compression hot press and subjected to predetermined temperature, pressure, vacuum, and time. In step 1105, the sandwiched mold is cooled to room temperature and 9 semi-finished lens blanks are removed from the mold.

Figure 12:
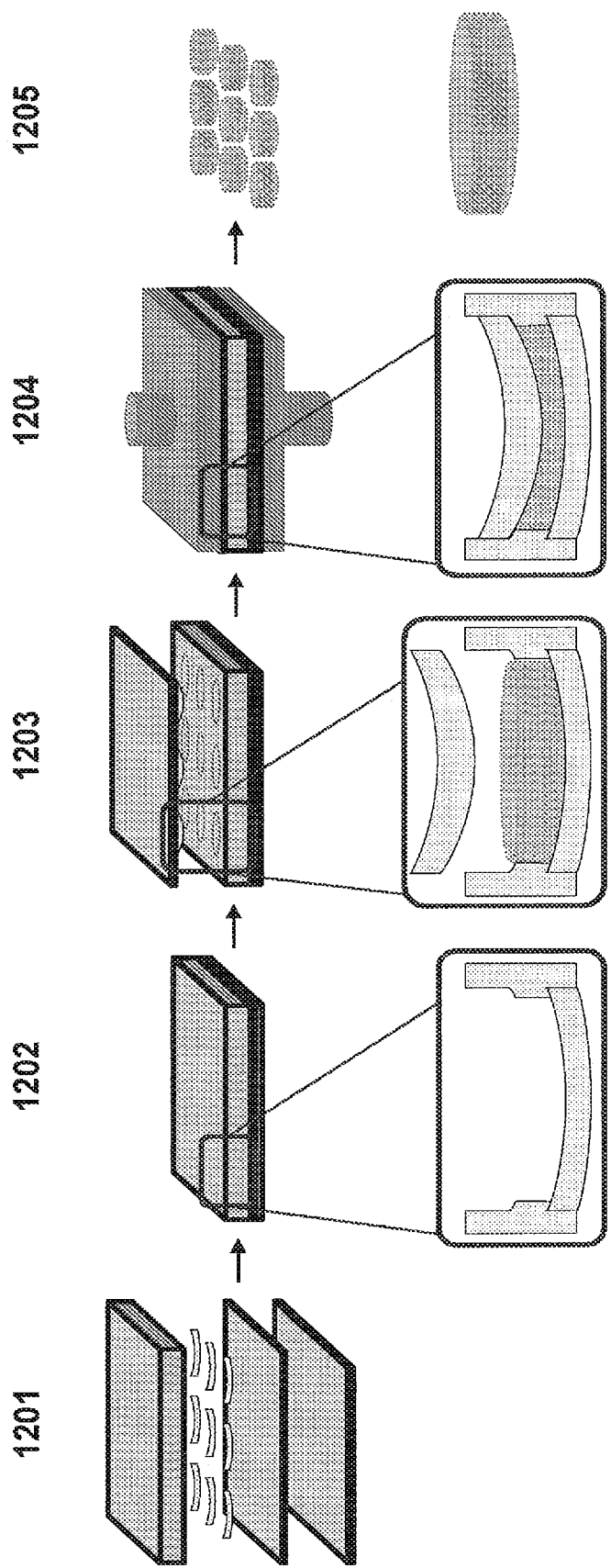
FIG. 12 is a schematic illustration of direct molding of thermoplastic material into cylindrical discs from which semi-finished lens blanks are molded, in accordance with some embodiments.

FIG. 12 is a schematic illustration of a direct molding process. Elements of a stainless-steel mold 1201 are provided, wherein the elements comprises (i) a square block with 9 round holes (~75 mm in diameter×10 mm tall in the top half and ~70 mm in diameter×10 mm tall in the bottom half), (ii) a middle plate with 9 round holes (~75 mm diameter×3 mm tall) to hold the front glass mold, and (iii) a bottom plate with 9 shallow wells. The mold is then assembled 1202 with 9 empty cavities, wherein the bottom plate is lined with a silicone pad (not shown), and a middle plate with front glass mold and the stainless-steel mold with 9 cavities are assembled together, Cylindrical discs are then transferred 1203 into the 9 empty cavities of the mold followed by back glass molds, silicone pads (not shown), and a top plate with 9 pistons (74-75 mm diameter×5 mm tall) to seal the mold assembly. In the expanded view, the stainless-steel mold with hollow cavity of different diameters aligns the two front and back glass molds and holds them apart by a certain thickness so that semi-finished lens blank of predetermined thickness can be easily molded from the cylindrical disc. The mold assembly is then subjected 1204 to a predetermined temperature, pressure and vacuum for a predetermined period of time as described above with respect to FIG. 4. The system is cooled to remove the 9 semi-finished lens blanks 1205 from the mold.

Figure 13:
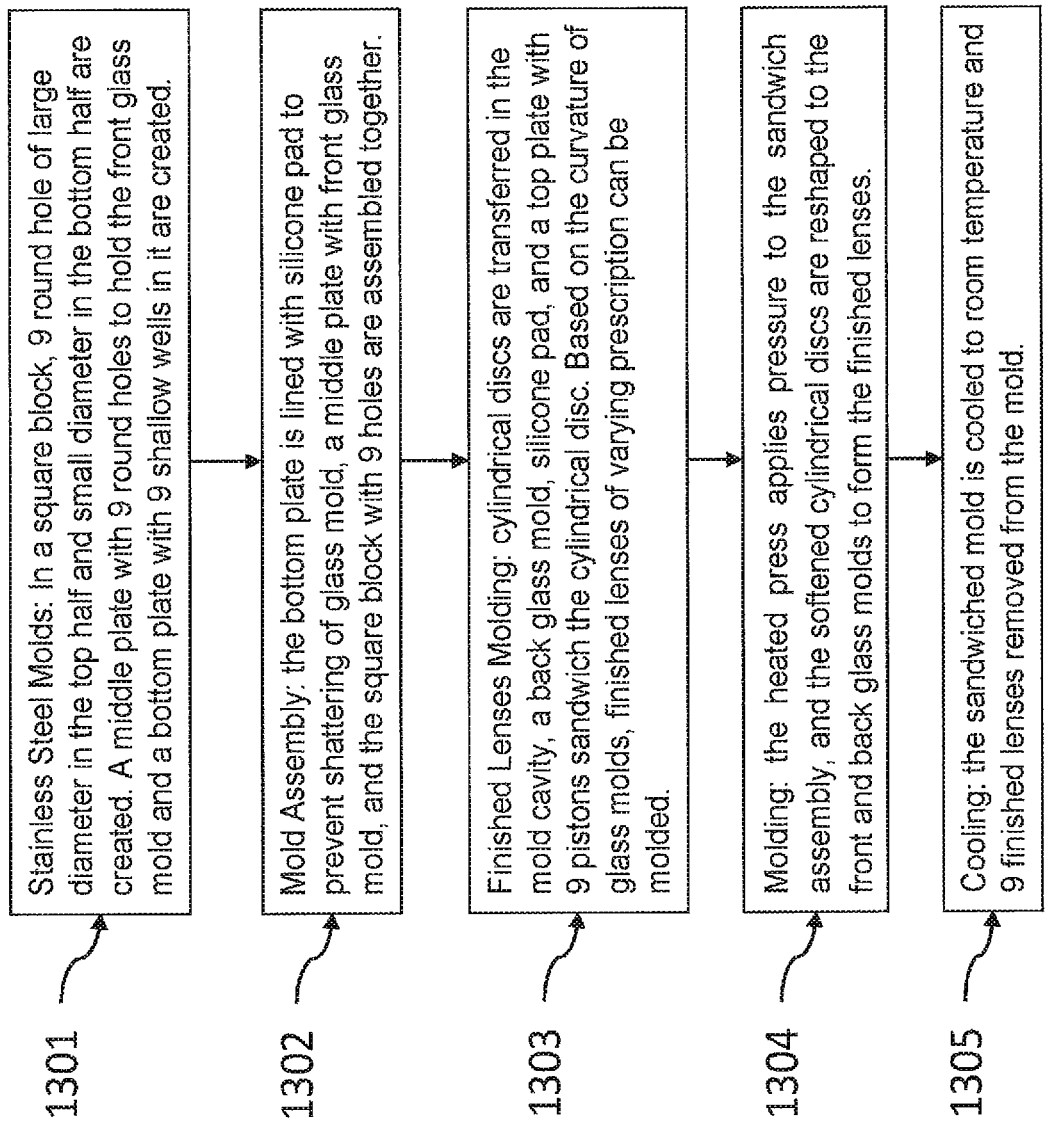
FIG. 13 is a flow chart of a process for direct molding of thermoplastic material into cylindrical discs from which finished lenses are molded, in accordance with some embodiments.

FIG. 13 is a flow chart of a provided direct molding process. In step 1301, a mold is provided, wherein the mold can be a stainless-steel mold that comprises (i) a square block with 9 round holes of different diameter in the top half vs. the bottom-half, (ii) a middle plate with 9 round holes, and (iii) a bottom plate having 9 shallow wells. In step 1302, the bottom plate is lined with a silicone pad to prevent shattering of glass mold, a middle plate holds a front glass mold, and the square block with 9 hollow cavities is assembled together with the other mold elements. In step 1303, cylindrical discs are transferred into the hollow cavities, back glass molds, silicone pads, and top plate with 9 pistons, sandwiching the cylindrical discs for semi-finished lens blank molding. Based on the curvature of glass molds, finished lenses of varying prescriptions can be molded. In step 1304, the mold assembly is placed between two platens of a compression hot press, and is subjected to predetermined temperature, pressure, vacuum and time as described above in FIG. 4. In step 1305, the sandwiched mold is cooled to room temperature and 9 finished lenses are removed from the mold.

Figure 14:
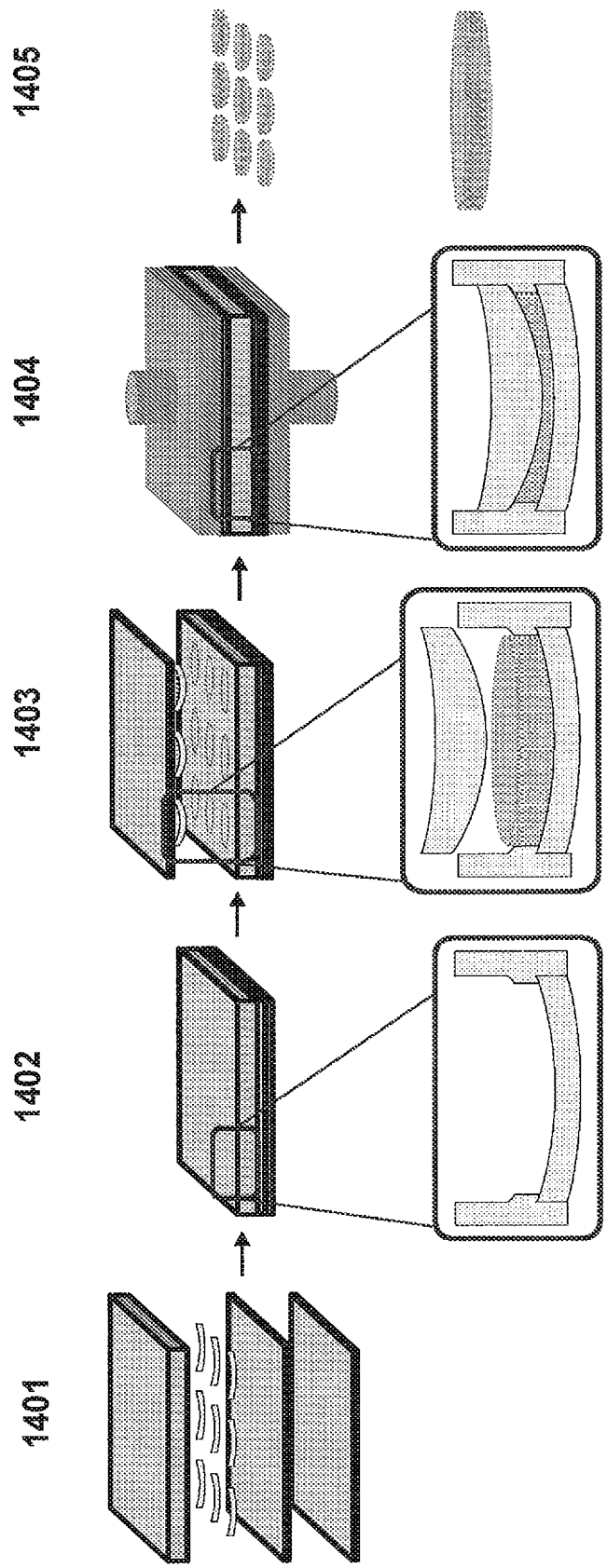
FIG. 14 is a schematic illustration of direct molding of thermoplastic material into cylindrical discs from which finished lenses are molded, in accordance with some embodiments.

FIG. 14 is a schematic illustration of a direct molding process. Elements of a stainless-steel mold 1401 are provided, wherein the elements comprises (i) a square block with 9 round holes (~75 mm in diameter×6 mm tall in the top 60% and ~70 mm in diameter×4 mm tall in the bottom 40%), (ii) a middle plate with 9 round holes (~75 mm diameter×3 mm tall) to hold the front glass mold, and (iii) a bottom plate with 9 shallow wells. The mold 1402 is assembled with 9 empty cavities, wherein the bottom plate is lined with a silicone pad (not shown), and the middle plate with a front glass mold and the stainless-steel mold with 9 cavities are assembled together. Cylindrical discs are transferred 1403 into the 9 empty cavities of the mold followed by back glass molds, silicone pads (not shown), and the top plate with 9 pistons (74-75 mm diameter×5 mm tall) to seal the mold assembly. In the expanded view, the stainless-steel mold with hollow cavity of different diameters aligns the two front and back glass molds and holds them apart by certain thickness so that finished lenses of predetermined thickness can be easily molded from the cylindrical disc. The mold assembly 1404 is subjected to a predetermined temperature, pressure and vacuum for a predetermined period of time as described above with respect to FIG. 4. The system is cooled to remove the 9 finished lenses 1405 from the mold.

Figure 15:
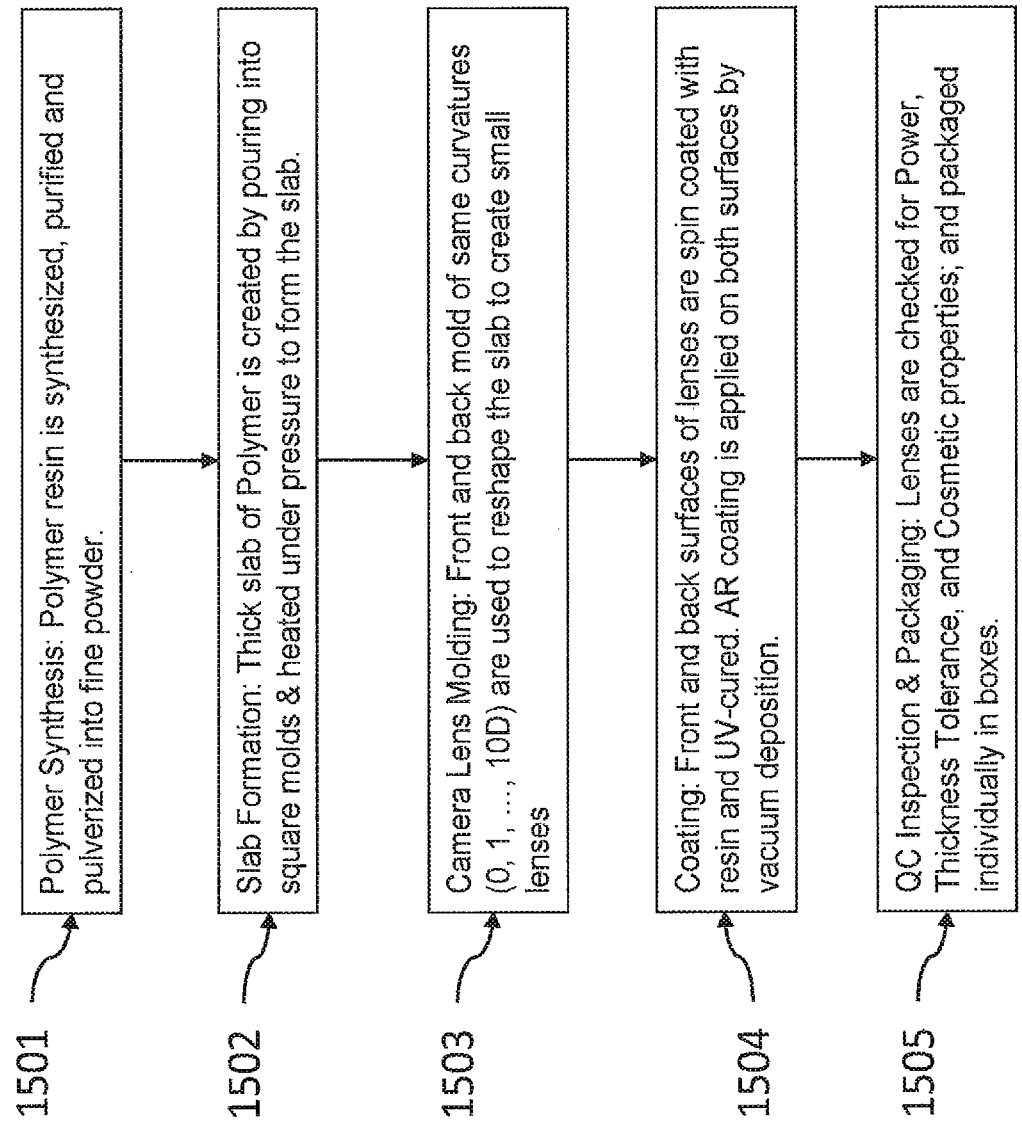
FIG. 15 is a flow chart of a process for direct molding of thermoplastic material into a slab from which camera lenses are molded, in accordance with some embodiments.

FIG. 15 is a flow chart of a provided direct molding process. In step 1501, a thermoplastic polymer is synthesized, purified, and pulverized into fine powder. In step 1502, a thick slab is formed by transferring the powder into the cavity of a square stainless-steel mold with tall walls and a port for a vacuum adapter. In step 1503, the thick slab is reshaped as described above in FIG. 4 by a molding process wherein back glass mold with convex side facing the slab and front glass mold with concave side facing the slab are used to make finished concave-convex lenses, and then the molded lenses are cut out of the slab. In step 1504, a hard coat resin is applied on the front and back surface of the lenses that are then UV-cured followed by AR coating. In step 1505, the lenses are quality checked for tolerances and cosmetic properties and packaged for shipment and use in camera lenses. In some embodiments, mold release agents and/or Kapton® film (high temperature) release film are used in the molding process.

Figure 16:
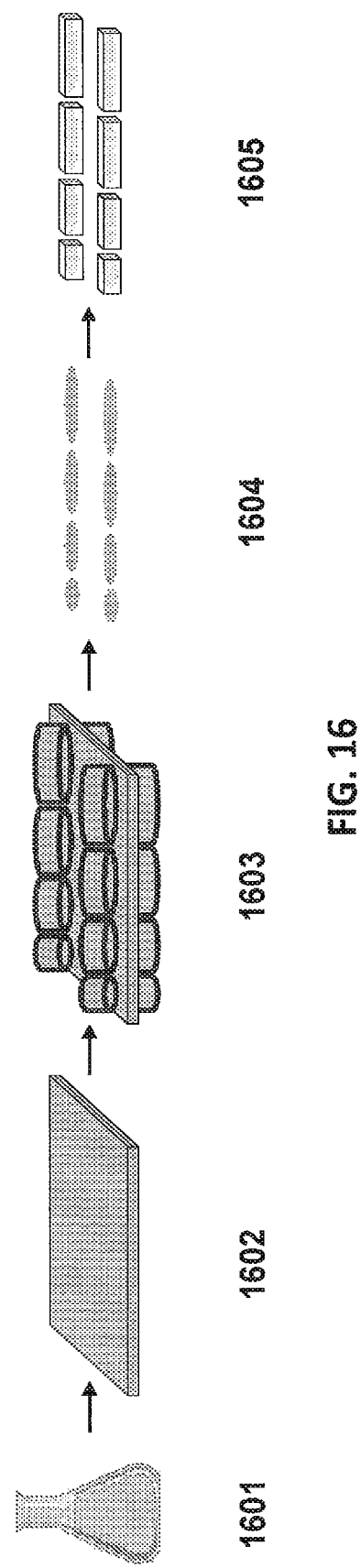
FIG. 16 is a schematic illustration of direct molding of thermoplastic material into a slab from which camera lenses are molded, in accordance with some embodiments.

FIG. 16 is a schematic illustration of a direct molding process. A polymer resin 1601 is synthesized. A thick slab 1602 is created by pouring the polymer into square molds and heating under pressure. Front and back glass molds 1603 of same radii with concave side of the front mold facing the slab and convex side of the black mold facing the slab are used to reshape (as described above in FIG. 4) the finished concave-convex lenses which are then cut out. The front and back surfaces of lenses 1604 are spin coated with resin and UV-cured followed by application of antireflective (AR) coating using, for example, vacuum deposition. The lenses are subjected to quality inspection and packaged 1605.

FIG. 17 is a table showing the number of glass molds needed to make finished lenses with single vision spherical correction, single vision sphero-cylindrical correction, and progressive addition lenses with sphero-cylindrical correction. For making single vision spherical correction from −10 D to +8 D in 0.25 D increments, front glass mold in 9 base curves, and back glass molds in 73 spherical prescription, for a total of 82 glass molds, are required. For making a single vision sphero-cylindrical correction from −10 D to +8 D sphere and −0.25 D to −6 D cylinder in 0.25 D increments, front glass mold in 9 base curves (as above), and back glass molds in 1752 sphero-cylindrical prescription that can be rotated from 1 to 180°, for a total of 1761 glass molds, are required. For making a front side progressive addition lens with back side sphero-cylindrical correction from −10 D to +8 D sphere and −0.25 D to −6 D cylinder in 0.25 D increments and +0.75 D to +4.00 D add power, front glass mold in 252 base curves, and back glass molds in 1752 sphero-cylindrical prescription that can be rotated from 1 to 180°, for a total of 2004 glass molds are required. The above mold numbers are best suited for the process where the thermoplastic can be reshaped for sphere followed by sphero-cylindrical followed by progressive addition corrections.

FIG. 18 is a table showing the number of glass molds needed to make finished lenses with single vision spherical correction, single vision sphero-cylindrical correction, and progressive addition lenses with sphero-cylindrical correction. For making single vision spherical correction from −10 D to +8 D in 0.25 D increments, front glass mold in 6 base curves, and back glass molds in 73 spherical prescription, are required. For making a single vision sphero-cylindrical correction from −10 D to +8 D sphere in 0.25 D increments (73 Rx), and −0.25 D to −6 D cylinder in 0.25 D increments (24 Rx each at 1° axis that can rotated from 1 to 180°); front glass mold in 6 base curves (as above) and back glass molds in (73×24×1=) 1752 sphero-cylindrical curves are required. For making a single vision sphero-cylindrical correction from −10 D to +8 D sphere in 0.25 D increments (73 Rx), and −0.25 D to −6 D cylinder in 0.25 D increments (24 Rx each at 1° axis from 0 to 90°, each rotated from 91 to 180° axis); front glass mold in 6 base curves (as above) and back glass molds in (73×24×90=) 157,680 sphero-cylindrical curves are required. For making a single vision sphero-cylindrical correction from −10 D to +8 D sphere in 0.25 D increments (73 Rx), and −0.25 D to −6 D cylinder in 0.25 D increments (24 Rx each at 1° axis that cannot be rotated from 0 to 180° axis); front glass mold in 6 base curves (as above) and back glass molds in (73×24×180=) 315,360 sphero-cylindrical curves are required. For making a front side progressive addition lens with back side sphero-cylindrical correction from −10 D to +8 D sphere and −0.25 D to −6 D cylinder in 0.25 D increments and +0.75 D to +4.00 D add power, front glass mold in 168 base curves, and back glass molds as described above for sphere and sphero-cylindrical curves are required. The above mold numbers are best suited for the process where the thermoplastic can be shaped at least once for sphere and progressive addition or sphero-cylindrical and progressive addition corrections.

Figure 19:
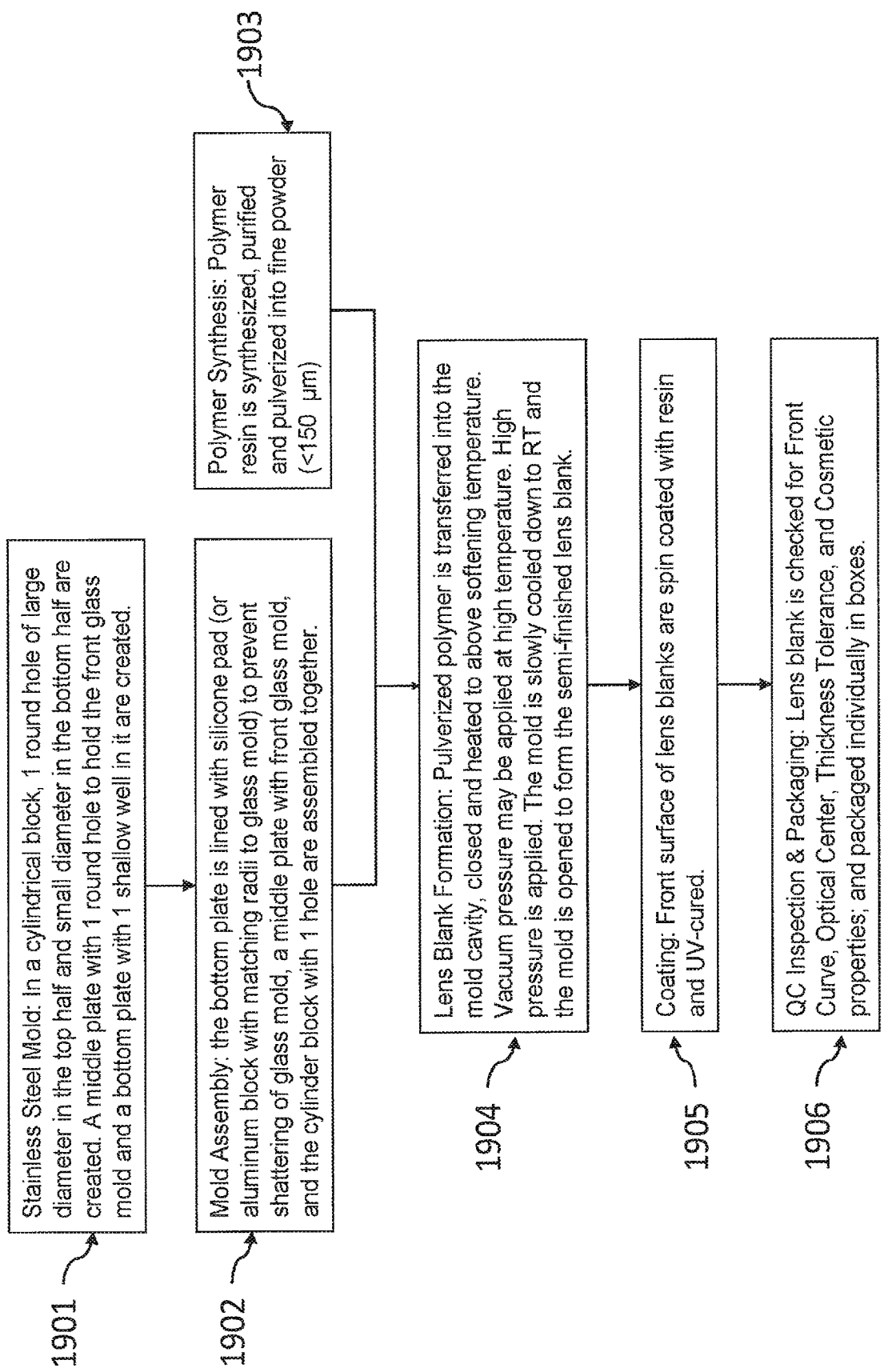
FIG. 19 is a flow chart of direct molding of thermoplastic, powdered material into semi-finished lens blank, in accordance with some embodiments.

FIG. 19 is a flow chart of a provided direct molding process. In step 1901, a cylindrical mold is provided, wherein the mold can be a stainless-steel mold that comprises (i) a cylindrical block with 1 round hole of different diameter in the top half vs. the bottom-half, (ii) a middle plate with 1 round hole, and (iii) a bottom plate having 1 shallow well. In step 1902, the bottom plate is lined with a silicone pad (or aluminum padding or block with matching radii to the glass mold) to prevent shattering of glass mold, a middle plate holds a front glass mold, and the cylinder block with 1 hollow cavity is assembled together with the other mold elements. In step 1903, a thermoplastic polymer is synthesized, purified, and pulverized into fine powder (particle size<150 μm). In step 1904, pulverized sieved powder is transferred into the hollow mold cavity, back glass mold, silicone pad, and top plate with 1 piston, sandwiching the polymer powder for semi-finished lens blank molding. Based on the curvature of glass molds, finished lenses of varying prescriptions can be molded. In the same step, the mold assembly is placed between two platens of a compression hot press, and is subjected to a predetermined temperature, pressure and vacuum for a predetermined period of time as described above with respect to FIG. 2. The sandwiched mold is cooled to room temperature and 1 semi-finished lens blank is removed from the mold. In step 1904, a hard coat resin is applied on the front and back surface of the semi-finished lens blank that are then UV-cured. In step 1905, the lens blank is quality checked for tolerances and cosmetic properties and packaged for shipment and use in camera lenses. In some embodiments, mold release agents and/or Kapton® film (high temperature) release film are used in the molding process.

Figure 20:
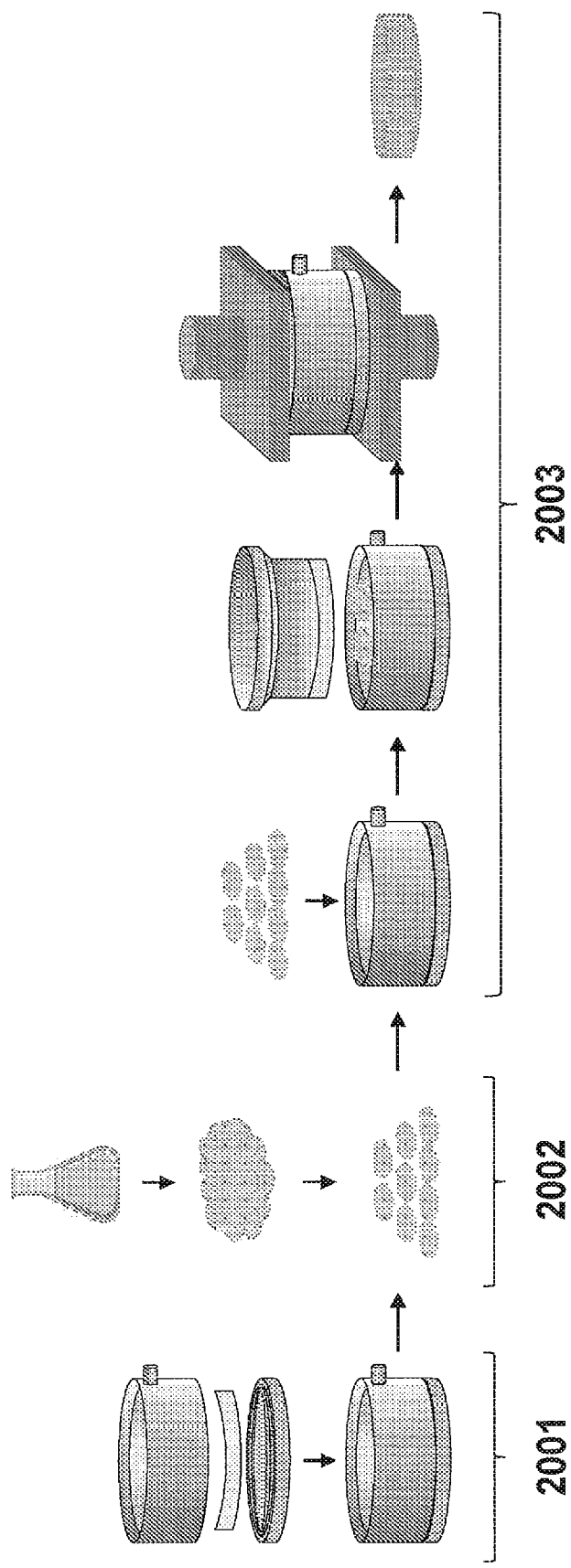
FIG. 20 is a schematic illustration of direct molding of thermoplastic, powdered material into semi-finished lens blank, in accordance with some embodiments.

FIG. 20 is a schematic illustration of a provided direct molding process. Stainless-steel mold 2001 is made of a hollow cylinder that is, for example, 20 mm tall with an adapter for a vacuum connector, and a bottom plate that serves as a front mold having a radius corresponding to 0, 2, 4, 6, and 8 D in power. A front glass mold of 75-mm diameter is snug fit in the bottom plate. Polymer resin 2002 is synthesized, purified and pulverized into fine powder (<150 μm). Molding process 2003 includes transferring the pulverized polymer to the mold cavity. Process 2003 also includes closing the mold using a back glass mold adhered to aluminum block with matching radii and supported by cylindrical piston head. Process 2003 also includes compressing the entire mold assembly between heated platens (represented by two plates with pistons in the 3$^{rd}$ illustration) at a predetermined temperature, pressure and vacuum for a predetermined period of time as described above with respect to FIG. 2. The mold is slowly cooled down to room temperature and is opened to remove the semi-finished lens blank.

Figure 21:
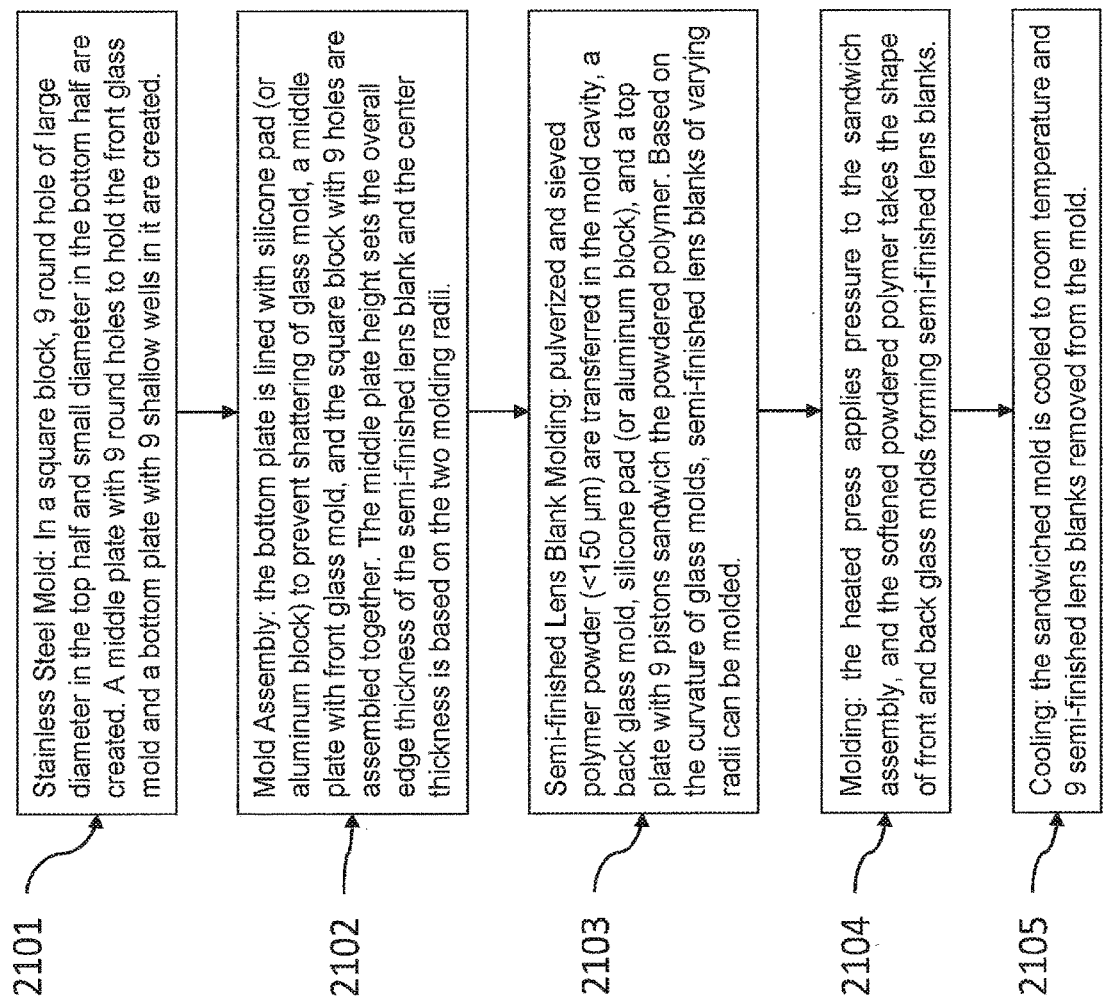
FIG. 21 is a flow chart of direct molding of thermoplastic, powdered material into semi-finished lens blanks, in accordance with some embodiments.

FIG. 21 is a flow chart of a provided direct molding process. In step 2101 a mold is provided, wherein the mold can be a stainless-steel mold that comprises (i) a square block with 9 round holes of different diameter in the top half vs. the bottom-half, (ii) a middle plate with 9 round holes, and (iii) a bottom plate with 9 shallow wells. In step 2102, the bottom plate is lined with silicone pad (or aluminum pad or aluminum block with radius of curvature matching the glass lens mold) to prevent shattering of the glass mold, a middle plate holds front glass mold, and the square block with 9 hollow cavities is assembled together with the other mold elements. The middle plate height sets the overall edge thickness of the semi-finished lens blank and the center edge is based on the two molding radii. In step 2103, pulverized powder sieved through Mesh #100 (particle size<150 μm) are transferred into the hollow cavities, back glass molds, silicone pad (or aluminum pad or aluminum block with radius of curvature matching the glass lens mold), and top plate with 9 pistons sandwich the pulverized powder for semi-finished lens blank molding. Based on the curvature of glass molds, semi-finished lens blanks of varying radii can be molded in this way. In step 2104, the mold assembly is placed between two platens of a compression hot press and subjected to a predetermined temperature and pressure for a predetermined period of time as described with respect to FIG. 4. In step 2105, the sandwiched mold is cooled to room temperature and 9 semi-finished lens blanks are removed from the mold.

Figure 22:
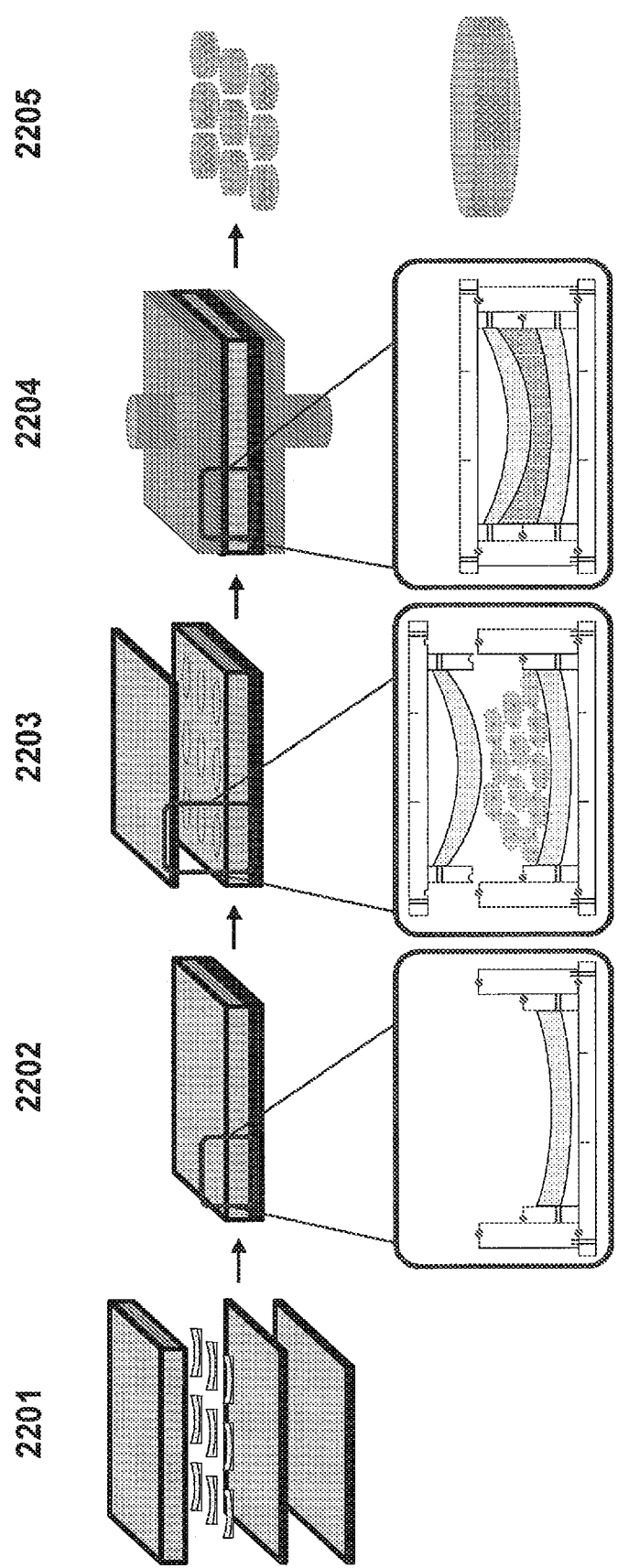
FIG. 22 is a schematic illustration of direct molding of thermoplastic, powdered material into semi-finished lens blanks, in accordance with some embodiments.

FIG. 22 is a schematic illustration of a direct molding process. Elements of a stainless-steel mold 2201 are provided, wherein the elements comprises (i) a square block with 9 round holes (~75 mm in diameter×10 mm tall in the top half and ~70 mm in diameter×10 mm tall in the bottom half), (ii) a middle plate with 9 round holes (~75 mm diameter×3 mm tall) to hold the front glass mold, and (iii) a bottom plate with 9 shallow wells. The mold is then assembled 2202 with 9 empty cavities, wherein the bottom plate is lined with a silicone pads (or aluminum pads or aluminum blocks), and a middle plate with front glass mold and the stainless-steel mold with 9 cavities are assembled together, pulverized powder sieved through Mesh #100 (particle size<150 μm) are then transferred 2203 into the 9 empty cavities of the mold followed by back glass molds, silicone pads (or aluminum pads or aluminum blocks), and a top plate with 9 pistons (74-75 mm diameter×5 mm tall) to seal the mold assembly. In the expanded view, the stainless-steel mold with hollow cavity of different diameters aligns the two front and back glass molds and holds them apart by a certain thickness so that semi-finished lens blank of predetermined thickness can be easily molded from the pulverized powder. The mold assembly is then subjected 2204 to a predetermined temperature and pressure for a predetermined period of time as described above with respect to FIG. 4. The system is cooled to remove the 9 semi-finished lens blanks 2205 from the mold.

Figure 23:
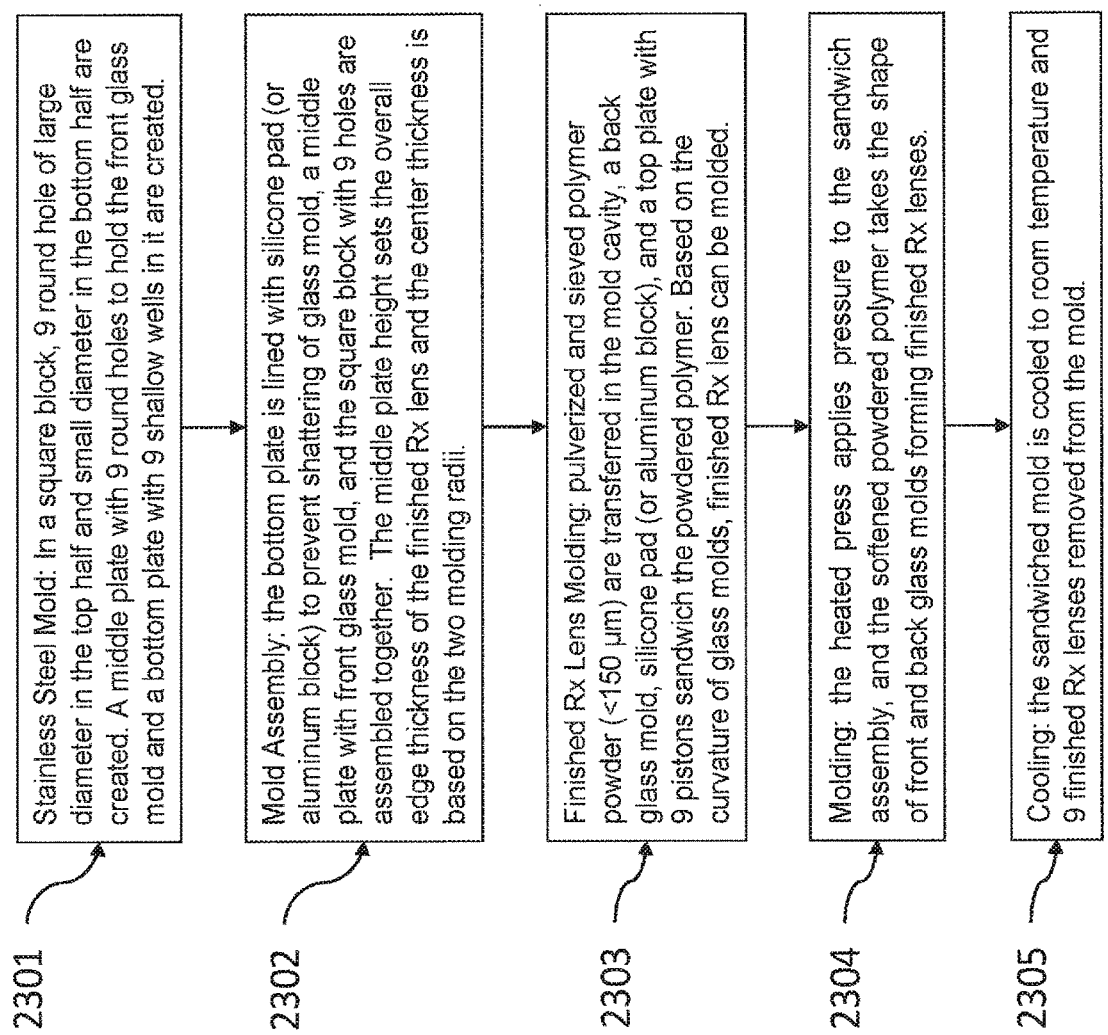
FIG. 23 is a flow chart of direct molding of thermoplastic, powdered material into finished Rx lenses, in accordance with some embodiments.

FIG. 23 is a flow chart of a provided direct molding process. In step 2301 a mold is provided, wherein the mold can be a stainless-steel mold that comprises (i) a square block with 9 round holes of different diameter in the top half vs. the bottom-half, (ii) a middle plate with 9 round holes, and (iii) a bottom plate with 9 shallow wells. In step 2302, the bottom plate is lined with silicone pad (or aluminum pad or aluminum block with radius of curvature matching the glass lens mold) to prevent shattering of the glass mold, a middle plate holds front glass mold, and the square block with 9 hollow cavities is assembled together with the other mold elements. The middle plate height sets the overall edge thickness of the finished Rx lens and the center edge is based on the two molding radii. In step 2303, pulverized powder sieved through Mesh #100 (particle size<150 μm) are transferred into the hollow cavities, back glass molds, silicone pad (or aluminum pad or aluminum block with radius of curvature matching the glass lens mold), and top plate with 9 pistons sandwich the pulverized powder for finished Rx lens. Based on the curvature of glass molds, finished Rx lenses of varying radii can be molded in this way. In step 2304, the mold assembly is placed between two platens of a compression hot press and subjected to a predetermined temperature and pressure for a predetermined period of time as described above with respect to FIG. 4. In step 2305, the sandwiched mold is cooled to room temperature and 9 finished Rx lenses are removed from the mold.

Figure 24:
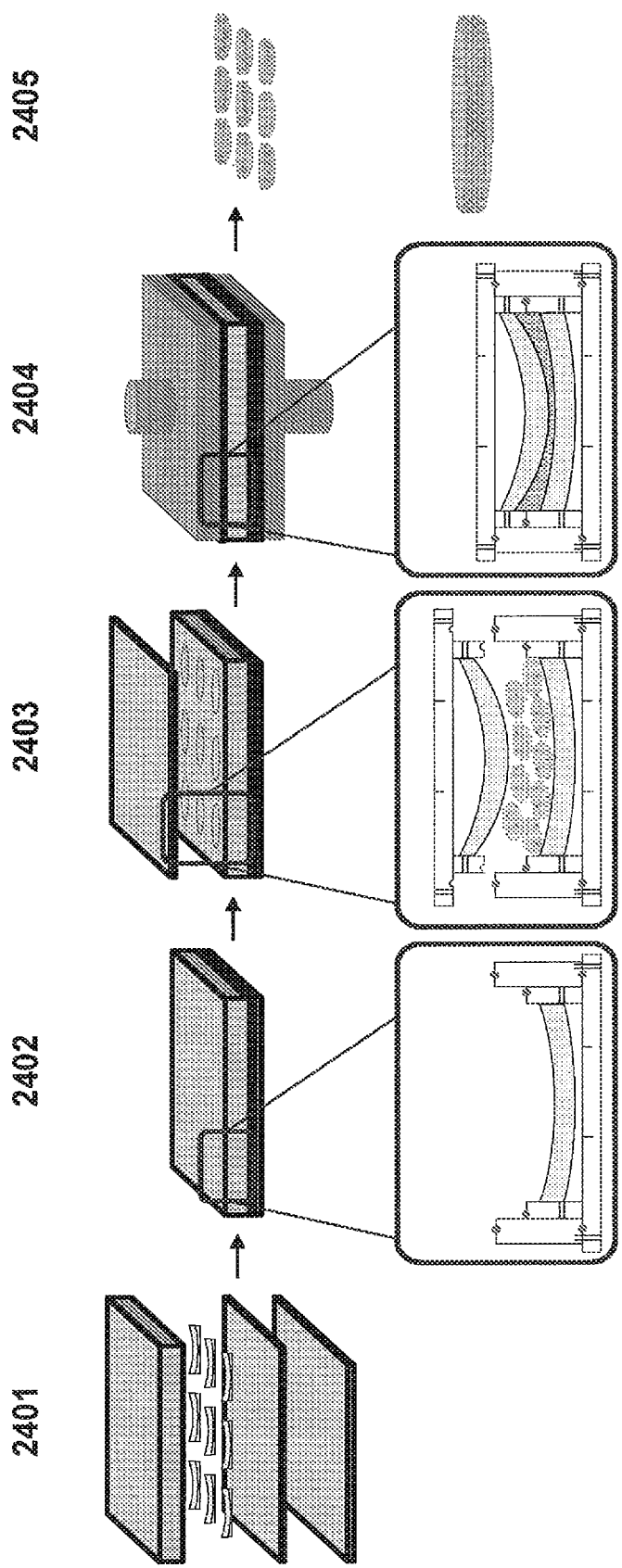
FIG. 24 is a schematic illustration of direct molding of thermoplastic, powdered material into finished Rx lenses, in accordance with some embodiments.

FIG. 24 is a schematic illustration of a direct molding process. Elements of a stainless-steel mold 2401 are provided, wherein the elements comprises (i) a square block with 9 round holes (~75 mm in diameter×10 mm tall in the top half and ~70 mm in diameter×10 mm tall in the bottom half), (ii) a middle plate with 9 round holes (~75 mm diameter×3 mm tall) to hold the front glass mold, and (iii) a bottom plate with 9 shallow wells. The mold is then assembled 2402 with 9 empty cavities, wherein the bottom plate is lined with a silicone pads (or aluminum pads or aluminum blocks), and a middle plate with front glass mold and the stainless-steel mold with 9 cavities are assembled together, pulverized powder sieved through Mesh #100 (particle size<150 μm) are then transferred 2403 into the 9 empty cavities of the mold followed by back glass molds, silicone pads (or aluminum pads or aluminum blocks), and a top plate with 9 pistons (74-75 mm diameter×5 mm tall) to seal the mold assembly. In the expanded view, the stainless-steel mold with hollow cavity of different diameters aligns the two front and back glass molds and holds them apart by a certain thickness so that finished Rx lenses of predetermined thickness can be easily molded from the pulverized powder. The mold assembly is then subjected 2404 to a predetermined temperature and pressure for a predetermined period of time as described above with respect to FIG. 4. The system is cooled to remove the 9 finished Rx lenses 2405 from the Mold.

Figure 25:
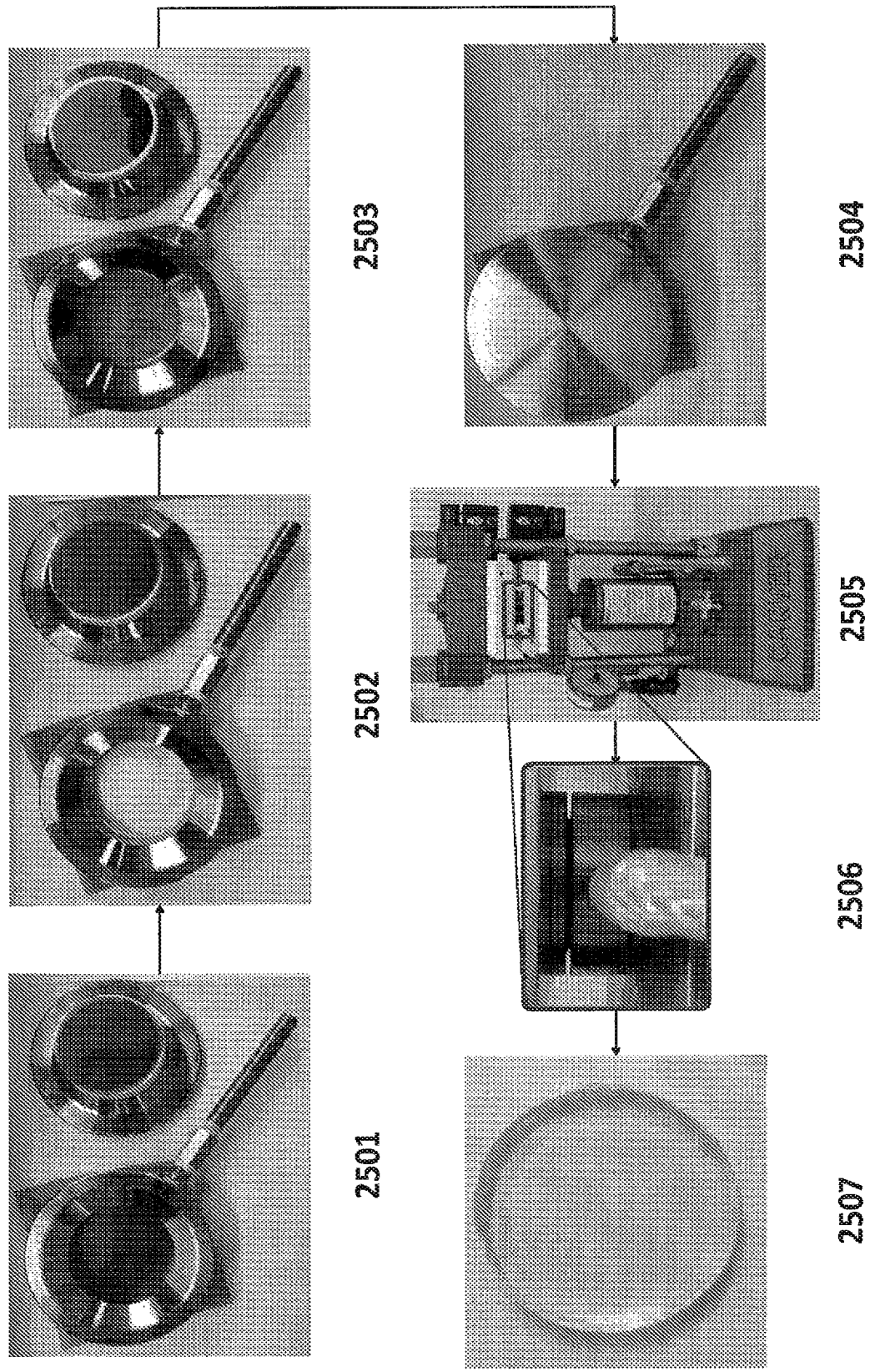
FIG. 25 is a pictorial reproduction of direct molding of thermoplastic material into individual semi-finished lens blanks as shown in FIG. 2, in accordance with some embodiments.

FIG. 25 is a pictorial reproduction of a direct molding process very similar to that described in FIG. 1 and FIG. 2 above. Stainless-steel mold 2501 is made of a hollow cylinder that is, for example, 20 mm tall with an adapter for a vacuum connector, and a flat bottom plate that serves as a front mold with 0 D power. The front mold is cut in the central 75-mm inner diameter and polished to a #8 mirror polished surface or Kapton® mold release sheet is used on regularly polished surface. Polymer resin 2502 is synthesized, purified and pulverized into fine powder. Molding process 2503 includes transferring the pulverized polymer to the mold cavity. Process 2503 also includes closing the mold using a #8 mirror polished back stainless-steel mold or use of Kapton® mold release sheet on the regularly polished cylindrical piston head. Process includes compressing the entire mold assembly 2504 between heated platens of Carver Press as shown in 2505 and in the magnified 2506, where the nylon reinforced plastic tubing is attached to the copper tube attached to the stainless steel mold at a predetermined temperature, pressure and vacuum for a predetermined period of time. In some embodiments, the predetermined heating temperature ranges between 100 to 210° C., more preferably between 150-160° C., with predetermined heating time between 15 minutes and 30 minutes, followed by additional heating under vacuum for 15 minutes, with predetermined compression between 100 and 20,000 pounds, more preferably between 400-500 pounds, for predetermined compression time of 15 minutes. The mold is slowly cooled down to room temperature and is opened to remove the cylindrical disc 2507.

Figure 26:
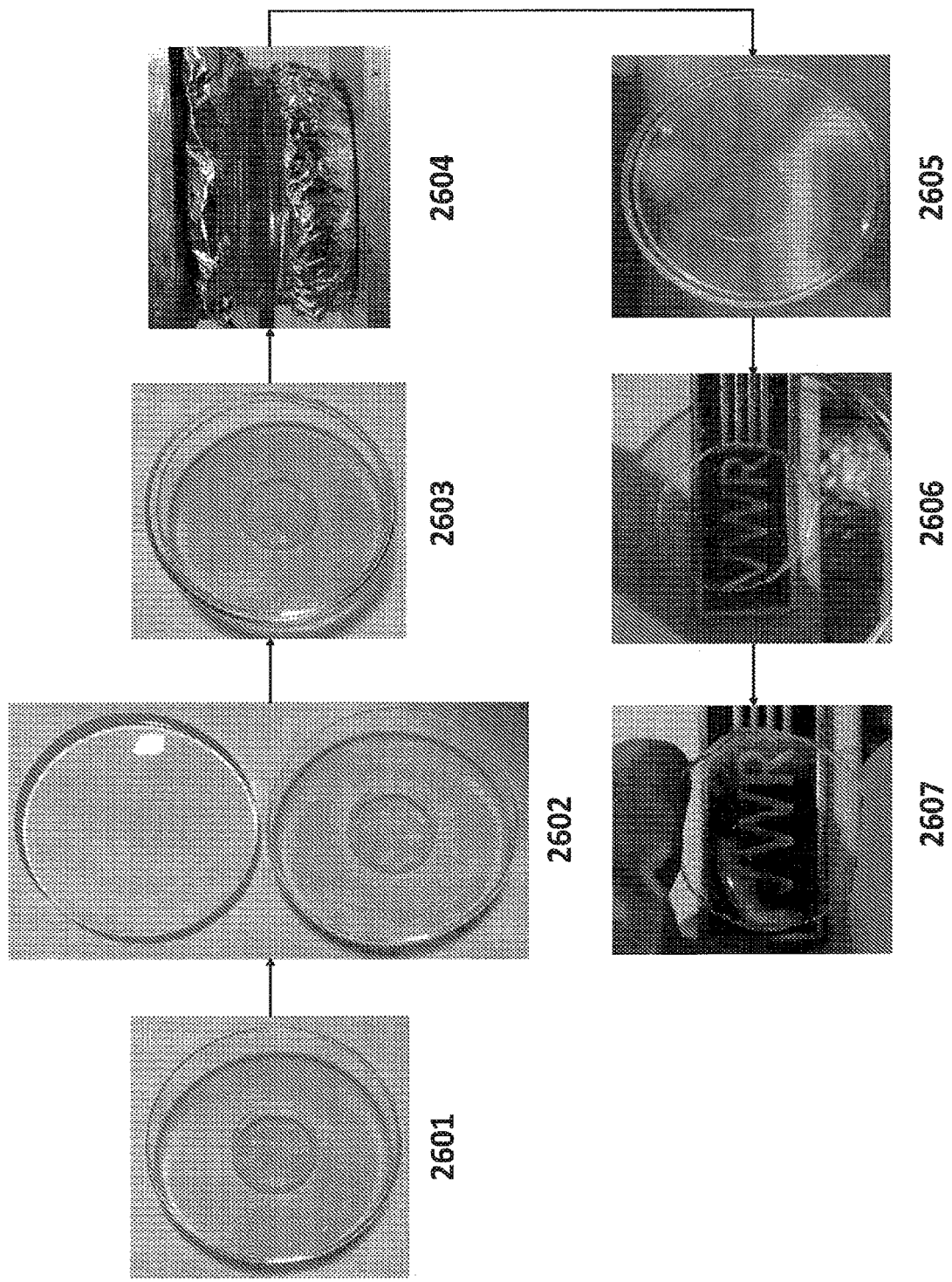
FIG. 26 is a pictorial reproduction of direct molding of 1 inch thermoplastic material cylindrical disc to a 1 inch finished lens as shown in FIG. 14, in accordance with some embodiments.

FIG. 26 is a pictorial reproduction of a direct reshaping process. In 2601, a front glass mold of predetermined radius of curvature is selected and a molded flat cylindrical disc (1 inch in diameter) is transferred onto the glass mold. In 2602, a back glass mold of predetermined radius of curvature is selected. In 2603, the cylindrical disc transferred onto the front glass mold is sandwiched with the back glass mold. In 2604, the sandwiched glass molds assembly is further sandwiched between aluminum pads (with wads of glass wool inside) and heated to 140-145° C. between two platens of compression molding press (not shown) without any compression for 2-4 minutes above the softening temperature of the cylindrical disc (typically above 140° C.). Pressure of 400 pounds is applied for compression time of 30 seconds to 2 minutes to the glass mold assembly to reshape the flat cylindrical disc into a 1 inch diameter prescription lens, as shown in 2605. The optical quality of the molded lens in between the glass molds is shown in 2606. In 2607, the transparency and optical quality is maintained in the mechanically stable free standing molded Rx lens.

Figure 27:
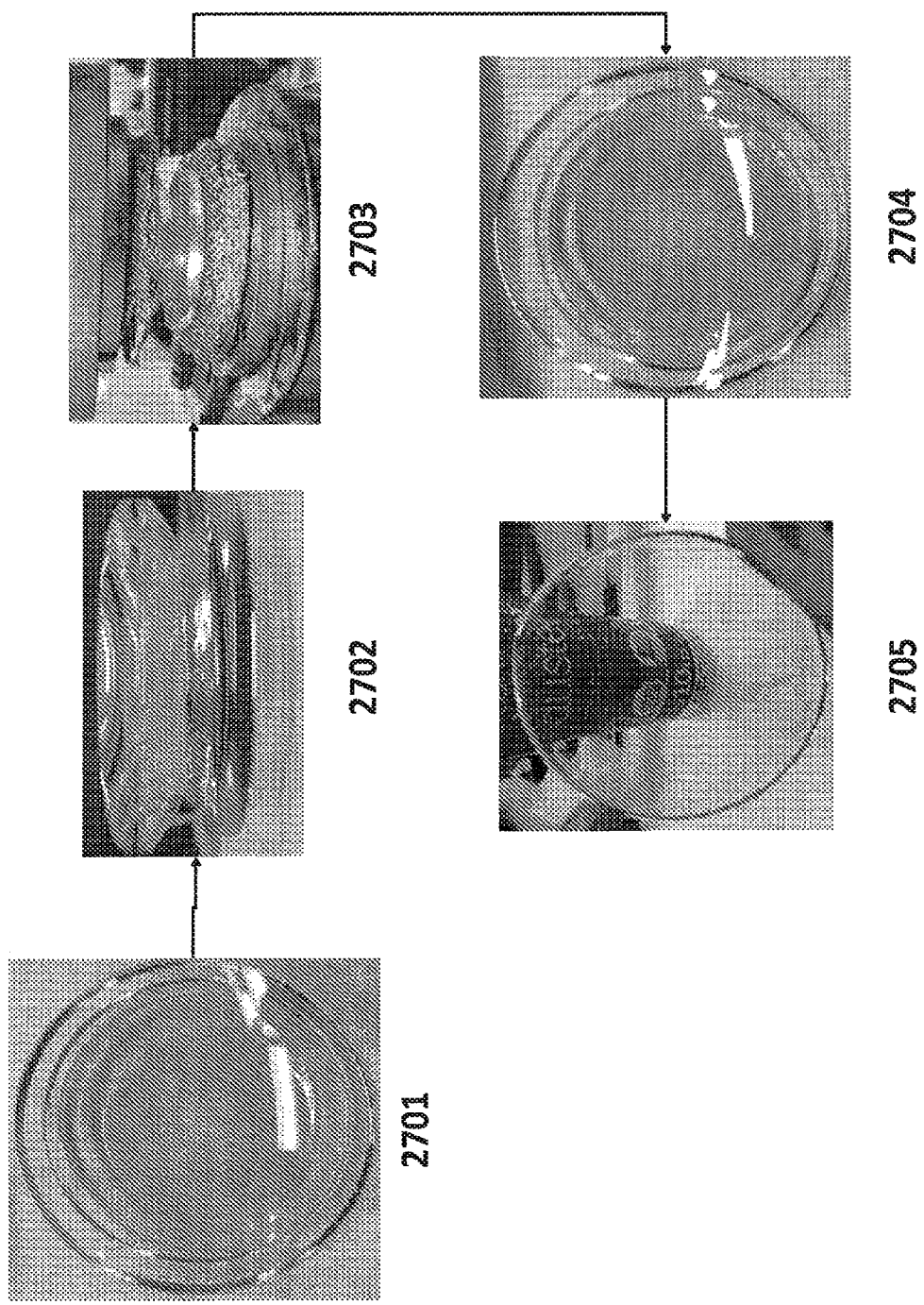
FIG. 27 is a pictorial reproduction of direct molding of 2.5 inch thermoplastic material cylindrical disc to a 2.5 inch semi-finished lens blanks as shown in FIG. 12, in accordance with some embodiments.

FIG. 27 is a pictorial reproduction of a direct reshaping process. In 2701, the sandwiched glass mold assembly is composed of front glass mold, 2.5 inch cylinder and the back glass mold. In 2702, the side view of the same assembly is displayed. In 2703, the mold assembly is further sandwiched between aluminum pads (with wads of glass wool inside) and heated to 140-145° C. between two platens of compression molding press (not shown) without any compression for 2-4 minutes above the softening temperature of the cylindrical disc (typically above 140° C.). Pressure of 400 pounds is applied for 30 seconds to 2 minutes to the glass mold assembly to reshape the flat cylindrical disc into a 2.5 inch diameter prescription lens, as shown in 2704. In 2705, the transparency and optical quality is maintained in the mechanically stable free standing molded Rx lens of certain myopic power.

Figure 28:
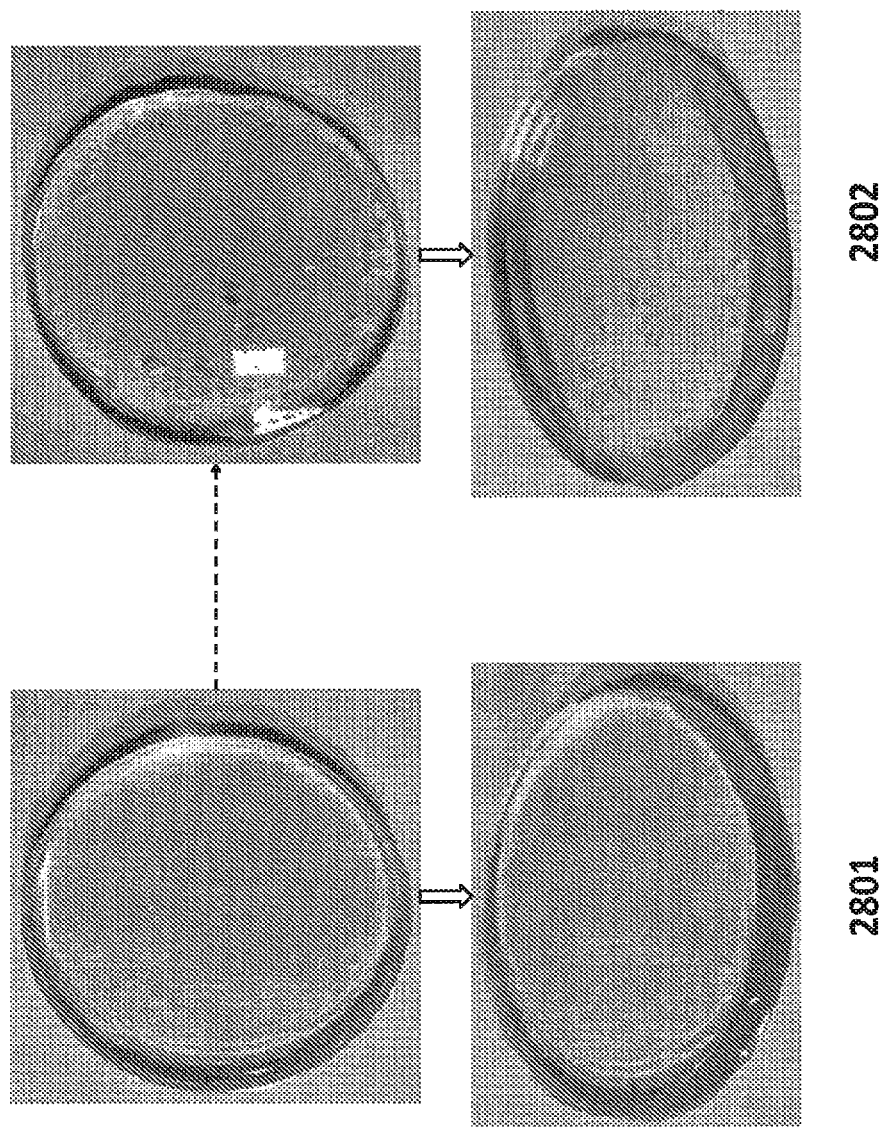
FIG. 28 is a pictorial reproduction of direct molding of 2.5 inch thermoplastic material cylindrical disc to a 2.5 inch semi-finished lens blanks as shown in FIG. 12, in accordance with some embodiments.

FIG. 28 is a pictorial reproduction of the cylindrical disc (63.5 mm diameter, 5.2 mm thickness) in 2801 with top view (on top) and side view (on bottom). A similar 60 mm diameter and 2 mm thick cylindrical disc was molded when 8.5 g of polymer powder was sandwiched between two 4×3 inch stainless steel plates with #8 mirror polish and lined with Kapton® mold release sheets and with two 1 mm thick, 65 mm outer diameter and 60 mm internal diameter annular aluminum rings which served as spacers was used at heating temperature of 160° C., heating time of 15 minutes, compression pressure of 20,000 pounds, and compression time of 15 minutes. After reshaping process is applied to a similar cylindrical disc, in 2802 a semi-finished lens blank, top view (on top) and side view (on bottom), was measured at diameter of 60 mm, with front curve of 3.5 D and back curve of −6.25 D, center thickness of 3.5 mm, and edge thickness of 4.8 mm. Such semi-finished lens blank can be processed through lathe cutting process to generate the Rx finished lens which can be coated with hard coat and AR coating, edged and mounted in eyeglass frames and use as prescription spectacle lenses for myopic correction.

Figure 29:
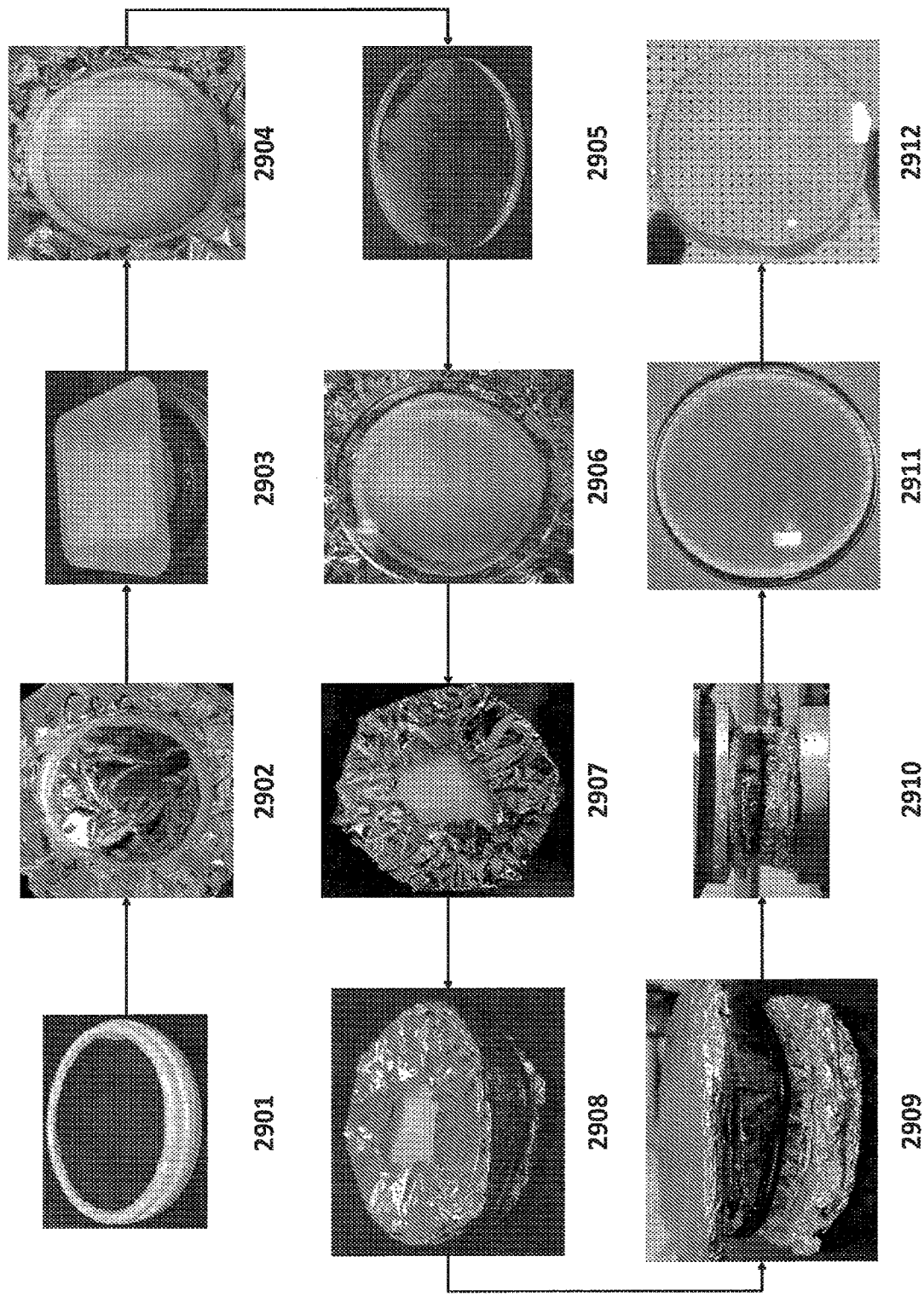
FIG. 29 is a pictorial reproduction of direct molding of thermoplastic material to a 2.5 inch finished Rx lens as shown in FIG. 24, in accordance with some embodiments.

FIG. 29 is a pictorial reproduction of the direct Rx molding process as described in FIGS. 23 and 24. In 2901, a front glass mold of predetermined radius of curvature is lined along its periphery with a Teflon covered o-ring which serves as the spacer for the final lens thickness and held by Teflon tape. In 2902, the front glass mold along with the Teflon o-ring spacer is wrapped in aluminum foil to prevent the polymer powder from falling out. In 2903, a known amount of polymer powder is weighed out. In 2904, the polymer powder is carefully transferred to the front glass mold. In 2905, a back glass mold of predetermined radius of curvature is selected. Based on the front and back radii of curvatures, sphero-cylindrical corrective prescription lenses for myopic, hyperopic, and plano (or no) power and progressive addition near vision corrective power lenses can be directly molded. In 2906, the back glass mold sandwiches the front glass mold with the polymer powder transferred on it. In 2907, the aluminum wrapper covers the entire sandwiched glass mold assembly. In 2908, the aluminum wrapper is further secured with another o-ring. In 2909, the glass mold assembly is further sandwiched between aluminum pads wrapped around wads of glass wool. In 2910, the sandwiched glass mold is heated in a compression press for certain period of time to high temperature and pressure above the softening temperature as described above with respect to FIG. 4 of the polymer powder. In 2911, the molded lens is removed from the glass mold after cooling down to room temperature. In 2912, the optical quality of the molded lens is evaluated by viewing the pin board and the myopic correction of the lens squeezes the pin holes closer together.

FIG. 30 is a table providing 10 examples of Rx lenses molding using the direct Rx molding process. The table provides the polymer powder that has been sieved from either Mesh #100 or #60, the front glass mold back curve, the back glass mold front curve, the molded Rx lens front curve, back curve, center and edge thicknesses, the Rx power of molded lens, the ANSI tolerance, and pass/fail result. From the table, it is clear that the molded lenses all pass the ANSI tolerances for power.

FIG. 31 is a table providing one example of an uncoated −3.0 D prescription molded lens that is subjected to US FDA, European Drop Ball and Static Load tests. This Rx molded lens with center thickness of 1.7 mm passed all of these minimum robustness tests as performed by Colts Laboratories, FL.

IV. Examples

The present invention will be further illustrated by reference to the following non-limiting examples.

Example 1: Preparation of a Thermoplastic Cylindrical Disc by Compression Molding of Thermoplastic Polymer Powder into a Customized Die A thermoplastic polymer was pulverized into a fine powder in a mixer. The polymer powder (~14 g) was then charged into a Kapton®-lined stainless steel dimple die cavity of 50 mm inner diameter which was retrofitted with a long copper tube that connected to a customized orifice at the side wall of the die, and a stainless steel flat circular bottom part on top of which the die sits snugly with screws and O-rings. The powder was covered with a Kapton® sheet cut to fit the inner diameter of the die. The die was then closed and placed between the two heated platens of a compression mold at 140° C. under a positive pressure for 30 minutes in order to melt the polymer. The copper tube of the die assembly was connected to a vacuum pump through a silicone rubber tube and the molten polymer was heated further under vacuum for 20 minutes. At this time the molten polymer inside the die was pressed at 800 pounds and held at pressure for 15 minutes to aid the polymer in assuming the shape of the die cavity. The die was then cooled with compressed air and the thermoplastic cylindrical disc was removed from the die by opening both the stainless steel flat circular bottom part of the die and the top cover.

Example 2: Preparation of a Semi-Finished Lens Blank of −5 D Power from the Thermoplastic Cylindrical Disc A back glass mold of base curve of 8.25 D was positioned on top of a front glass mold of base curve of −3.25 D by aligning the center of these two molds. The aligned glass molds were then placed on a flat glass wool pad made by wrapping glass wool inside an aluminum foil. The top glass mold was covered with another flat glass wool pad and the entire assembly was heated in between two hot platens of a compression mold at 132° C. for 30 minutes under positive pressure. The glass wool pads provided a cushion keeping the glass molds from shattering under high pressure. The thermoplastic cylindrical disc as described in Example 1 was placed between the hot glass molds. The glass molds were sandwiched between the two glass wool pads and heated between the hot platens at 132° C. under positive pressure for 3-4 minutes while slowly applying pressure to bend the softened disc, followed by the application of pressure at 200 pounds for 1-1.5 minutes. At this point the soft disc assumed the shape of the front and back glass molds. This mold disc assembly was cooled to room temperature and the semi-finished lens blank of −5 D was removed.

Example 3: Preparation of a Finished Rx Lens from the Thermoplastic Cylindrical Disc The molding process for the preparation of finished Rx lens from the thermoplastic cylindrical disc was identical to the process of making semi-finished lens blank from the thermoplastic cylindrical disc except that the glass molds used were of exact prescriptions instead of generic molds of standard base curves.

Example 4: Preparation of a Finished Rx Lens from Polymer Powder

A front glass mold having a back radius of curvature of −3.5 D was lined along its periphery with Teflon covered two o-rings which serves as the spacer for the final lens thickness and held by Teflon tape. The front glass mold along with the Teflon covered two o-rings spacer was wrapped in aluminum foil to prevent the polymer powder from falling out. The entire assembly was secured with a rubber o-ring. A 13 g of polymer powder sieved through Mesh #100 was weighed out in a plastic dish. The polymer powder was carefully transferred to the middle of front glass mold. A back glass mold having a front radius of curvature of 6.5 D was selected and the front glass mold was sandwiched with the back glass mold. Care was taken when sandwiching the glass molds so that the powder did not spill out and the powder was compacted during the sandwiching process. The aluminum sheet was wrapped around the entire sandwiched glass mold assembly. The aluminum wrapper was further secured with another rubber o-ring. The glass mold assembly was then sandwiched between aluminum pads wrapped around wads of glass wool and the sandwiched assembly was then heated in a compression press (such as Carver with heated platens) for 15 minutes at 160-165° C. (depending on the softening temperature) without any significant amount of pressure. After 15 minutes of heating, 400-500 pounds of pressure was applied for another 15 minutes while the assembly was being heated. After 15 minutes, the heating was stopped and the glass mold assembly was cooled with room temperature air until it reached 50-60° C. and handling was manageable. The molded lens of −3.0 D prescription was removed and evaluated for power and optical quality such as clarity and bumpiness using manual lensometer (American Optical). Instead of o-ring(s), any other spacer made of any material such as aluminum or Teflon® or any other high temperature resistant polymer can be used, in accordance with various embodiments. The spacer thickness can be 1-50 mm as long as it can withstand the temperature and pressure of molding. The thickness of the spacer controls the edge thickness of the molded lens while the two radii of curvatures of the glass molds (front and back) provides the center thickness. Alignment of the optical centers of the glass molds is important to yield the molded lens to have the correct prescription without any unwanted prism in the molded lens.

Example 5: Mechanical Testing of Prescription Rx Lens

An uncoated −3.0 D prescription molded lens was subjected to US FDA Drop ball (⅝ inch diameter stainless steel ball weighing~16 g and dropped from 50 inch height), European Drop Ball (⅞ inch diameter stainless steel ball weighing~45 g and dropped from 50 inch height) and Static Load tests (150 N for 10 seconds). This Rx molded lens with center thickness of 1.7 mm passed all of these minimum robustness tests as performed by Colts Laboratories, FL.

Example 6: Preparation of a Thermoplastic Cylindrical Disc by Compression Molding of thermoplastic polymer powder, film or slab between stainless steel plates. (a) Polymer powder, film or slab formation: A thermoplastic polymer was pulverized into a fine powder in a mixer. Alternate processes to pulverize the polymer chunks into fine powder are ball mill grinder, pin mill, attrition mill, air classified mill, or similar types of mills. If there is a need to cryogenically cool the polymer, SPEX Sampler 6850 Freezer mill with stainless steel piston and cylinder are used to pulverize the polymer under liquid nitrogen temperature. An alternate process of obtaining a fine powder is to spray dry the thermoplastic polymer in a known solvent such as Dimethyl Acetamide (DMA) or N,N-dimethyl Formamide (DMF) at certain weight percent (3-12 wt % solids) and run it through a spray-dryer system equipped with solvent recovery unit such as manufactured by Yamato Scientific USA (Santa Clara, Calif.) (GB210 Spray Dryer and GAS410 Solvent Recovery Unit). The polymer dissolved in solvent is atomized at elevated temperatures (150-165° C.) by using heated Nitrogen gas to create a fine mist of particles which are transferred to the cyclone portion of the spray dryer and slightly moist powdered particles are collected in the collection chamber. The solvent vapor is condensed by cooling it as part of the spray-drying process and collected separately for further recycling. The powdered particles may be dried at elevated temperatures (100-110° C.) under vacuum using a 1 HP vacuum pump for predetermined period of time to completely dry the thermoplastic powder. Another alternate way to obtain films or slabs is to take the wet precipitated thermoplastic polymer and compress between #8 mirror polished stainless steel plates or Teflon plates and annular spacers of predetermined thickness (ranging from 0.1 to 5 mm) at 10,000 pounds at room temperature for 10 minutes and then heating the plates between Carver compression molding press platens that are heated to 90° C. for 5 minutes while the polymer is still under pressure. The platens are cooled down and thin film that may be clear or slightly opaque due to presence of trapped solvent is peeled off. The flexible film or slab can be further dried at elevated temperatures (100-110° C.) under vacuum using a 1 HP vacuum pump for predetermined period of time to completely dry to yield thermoplastic rigid film or slab.

(b) Preparation of thermoplastic cylindrical disc: The polymer powder or films stacked together or slabs (~14 g) obtained from any of the processes described above was then placed in between two #8 mirror polished stainless steel plates (3×3 inch) with 1.5-2.0 mm thick round annular spacer wrapped with Teflon (open inner diameter of 60 mm, and outer diameter of 70 mm) and compressed at room temperature at 20,000 pounds pressure in a Carver Press (equipped with heated platens) for 10 minutes. The pressure was then released and the room temperature pressed disc evaluated. The disc was then returned back to the #8 mirror polished stainless steel plates with annular spacer as described above. The platens were heated to 160-165° C. and the disc was pressed for 10 minutes at 1,000 pounds in order to melt the polymer followed by pressing at 20,000 pounds with continued heating for 15 minutes. The platens were cooled down to room temperature while maintaining the applied pressure. The plates were separated and a clear, colorless, transparent cylindrical disc of thermoplastic material is obtained. The dimensions of the disc are 60 mm in diameter and thickness of 1.5-2.0 mm depending on the thickness of annular spacers used.

Example 7: Complete Pair of Rx Lenses Molded from Thermoplastic Disc and Mounted in Eyeglass Frames (a) Preparation of a Rx −5 D power lens from thermoplastic cylindrical disc: A back glass mold of base curve of 8.25 D was placed on a flat glass wool pad made by wrapping glass wool inside an aluminum foil. The 60 mm diameter thermoplastic cylindrical disc as described in Example 6(b) inside a 70 mm Teflon wrapped annular spacer with 60 mm opening and predetermined thickness was placed on the glass mold. A top front glass mold of base curve of −3.25 D was placed on top of the thermoplastic disc that was placed in the bottom glass mold with care so that the center of these two molds are aligned. A flat glass wool pad made by wrapping glass wool inside an aluminum foil was placed on the aligned glass molds. The glass molds with thermoplastic disc sandwiched between the two glass molds and the wool pads are heated between the hot platens in a compression press (such as Carver) at 165-170° C. under positive pressure of 100 pounds for 10 minutes while slowly applying pressure to bend the softened disc, followed by the application of pressure at 1,000 pounds for 15 minutes. The glass wool pads provided a cushion keeping the glass molds from shattering under high pressure. At this point the soft disc assumed the shape of the front and back glass molds. After known period of time, the heating is stopped and the glass mold assembly is cooled to room temperature. The sandwiched assembly is separated and the molded Rx ophthalmic lens is removed and evaluated for power and optical quality such as clarity and bumpiness using lensometer or automated evaluation equipment. The measured Rx lens was −5 D and center thickness of 1.5 mm. Alignment of the optical centers of the glass molds is important to yield, the molded ophthalmic lens to be free of unwanted prism.

(b) Preparation of complete pair of eyeglass lenses mounted in frames: The molded Rx lens(es) may be further coated with scratch resistant hard coat using either spraying hard coat resin following by UV-light curing (such as the resins sold by Ultra Optics, Inc.) or applying hard coat by dipping the Rx lens in a pool of hard coat resin (such as sold by SDC (Mitsui) or SCL, Inc.) and thermally curing the resin to form a scratch resistant layer; followed by application of antireflective (AR) coating by vapor deposition (such as sold by Satis or Buhler, Inc) to enhance the transmittance of visible light. A pair of hard and AR coated Rx lenses can be edged to the shape of the frame (metal or plastic zyl or drilled rimless or fish-wire) and mounted in the frame with desired feature (such as bevel for zyl, drilled holes for rimless, and groove for fish-wire frames) to make a pair of complete prescription eyeglass lenses. Similar process can be used to mold a light guide, a fiber optic, a film, a sheet, sunglasses, magnifying glasses, concentrators for solar cells, and microscopic lenses.

While various embodiments of the present disclosure have been described above, it should be understood that they have been presented by way of example only, and not by way of limitation. Likewise, the various diagrams may depict exemplary components, structures and/or configurations, which are provided to enable persons of ordinary skill in the art to understand exemplary features and functions of the present disclosure. Such persons would understand, however, that the present disclosure is not restricted to the illustrated example structures, components or configurations, but can be implemented using a variety of alternative structures, components and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for making an optical element, the method comprising:
   providing a thermoplastic material, wherein the thermoplastic material has the shape of a disc or slab or is in the form of a polymer powder;
   providing an assembly comprising one or more annular rings configured to hold one or more sandwiched glass molds, wherein each sandwiched glass mold comprises a front glass mold and a back glass mold, wherein a front glass back surface of the front glass mold has a front mold radius, and wherein a back glass front surface of the back glass mold has a back mold radius;
   inserting at least a portion of the thermoplastic material between the front glass mold and the back glass mold of the assembly;
   positioning the assembly between two platens of a hydraulic press;
   heating the assembly to a predetermined heating temperature for a predetermined heating time;
   compressing the assembly at a predetermined compression pressure for a predetermined compression time;
   cooling the assembly, thereby forming one or more thermoplastic optical elements, wherein each thermoplastic optical element comprises an optical element front surface and an opposite optical element back surface, wherein the optical element front surface has a front surface radius substantially equal to the front mold radius, and wherein the optical element back surface has a back surface radius substantially equal to the back mold radius; and
   removing the one or more thermoplastic optical elements from the assembly.

2. The method of claim 1, wherein the thermoplastic material comprises one or more polymers formed from petroleum or biobased monomers.

3. The method of claim 2, wherein the one or more polymers comprise one or more crosslinked polymers.

4. The method of claim 2, wherein the biobased monomers comprise sugar moieties derived from corn.

5. The method of claim 2, wherein the biobased monomers comprise sorbitol, isosorbide, isomannide, isoidide, and derivatives and combinations thereof.

6. The method of claim 2, wherein the one or more polymers comprise polyurethane, polycarbonate, polyester, polyamide, poly(meth)acrylate, or combinations thereof.

7. The method of claim 1, wherein the thermoplastic material is in a powder form with particle size <150 μm.

8. The method of claim 1, wherein the thermoplastic material has the shape of a disc having a diameter from 55 mm to 95 mm.

9. The method of claim 1, wherein the thermoplastic material has the shape of a disc having a center thickness from 1 mm to 25 mm.

10. The method of claim 1, wherein the thermoplastic material is cut from a molded slab having predetermined dimensions.

11. The method of claim 1, wherein the front glass mold and the back glass mold are each lined with a silicone pad positioned adjacent to the thermoplastic material upon insertion of at least a portion of the thermoplastic material into the assembly.

12. The method of claim 1, wherein the one or more annular rings are interconnected and configured to hold nine sandwiched glass molds, and wherein the cooling forms nine thermoplastic optical elements.

13. The method of claim 1, wherein the front glass mold and the back glass mold are each selected from a set comprising: (1) nine front glass molds, each having a different back curvature between 0 D to 10 D; and (2) two back glass molds, each having a different front curvature between 4.25 D and 5.25 D.

14. The method of claim 1, wherein the front glass mold and the back glass mold are each selected from a set comprising: (1) 9 front glass molds, each having a different back curvature between 0 D to 10 D; and (2) 73 back glass molds, each having a different spherical prescription between −10 D and +8 D with 0.25 D intervals between the spherical prescriptions.

15. The method of claim 1, wherein the front glass mold and the back glass mold are each selected from a set comprising: (1) 9 front glass molds, each having a different back curvature between 0 D to 10 D; and (2) 1752 back glass molds, each having a different combination of (2a) a spherical prescription between −10 D and +8 D with 0.25 D intervals between the spherical prescriptions, and (2b) a cylinder correction between −0.25 D and −6 D with 0.25 D intervals between the cylinder corrections along a meridian from 1° to 180°.

16. The method of claim 1, wherein the front glass mold and the back glass mold are each selected from a set comprising: (1) 252 front glass molds, each having a different combination of (1a) a back curvature between 0 D to 10 D, and (1b) an addition power between +0.75 D and +4 D; and (2) 1752 back glass molds, each having a different combination of (2a) a spherical prescription between −10 D and +8 D with 0.25 D intervals between the spherical prescriptions, and (2b) a cylinder correction between −0.25 D and −6 D with 0.25 D intervals between the cylinder corrections along a meridian from 1° to 180°.

17. The method of claim 1, wherein the predetermined heating temperature is between 100° C. and 210° C.

18. The method of claim 1, wherein the predetermined heating time is between 15 minutes and 30 minutes.

19. The method of claim 1, wherein the predetermined compression pressure is between 100 pounds and 20,000 pounds.

20. The method of claim 1, wherein the predetermined compression time is between 30 seconds and 15 minutes.

21. The method of claim 1, wherein the one or more thermoplastic optical elements are a semi-finished lens blank or a finished prescription lens.

22. The method of claim 1, wherein the one or more thermoplastic optical elements are semi-finished lens blanks, finished single vision lenses, or finished progressive addition lenses.

23. The method of claim 1, wherein the finished prescription lens is selected from either a single vision lens or progressive addition lens.

* * * * *